United States Patent
Egashira

(10) Patent No.: US 7,855,713 B2
(45) Date of Patent: Dec. 21, 2010

(54) PROGRAM, INPUT EVALUATION SYSTEM, AND INPUT EVALUATION METHOD

(75) Inventor: Norio Egashira, Kanagawa-Ken (JP)

(73) Assignee: Namco Bandai Games Inc., Tokyo (JP)

( * ) Notice: Subject to any disclaimer, the term of this patent is extended or adjusted under 35 U.S.C. 154(b) by 802 days.

(21) Appl. No.: 11/819,103

(22) Filed: Jun. 25, 2007

(65) Prior Publication Data

US 2008/0012732 A1 Jan. 17, 2008

(30) Foreign Application Priority Data

Jun. 28, 2006 (JP) ............................. 2006-177726

(51) Int. Cl.
*G09G 5/00* (2006.01)

(52) U.S. Cl. ............................ 345/156; 345/173; 463/4; 463/37

(58) Field of Classification Search ......... 345/156–179; 463/1–5, 31–34, 36–38; 178/18.01–18.09, 178/18.11, 19.01–19.06, 20.01; 715/700, 715/764, 863
See application file for complete search history.

(56) References Cited

U.S. PATENT DOCUMENTS 7,445,549 B1 * 11/2008 Best ............................ 463/32

| | | | |
|---|---|---|---|
| 2005/0164784 A1 * | 7/2005 | Yamamoto et al. ............ 463/30 |
| 2005/0197188 A1 * | 9/2005 | Iizuka et al. ................. 463/36 |
| 2005/0215323 A1 | 9/2005 | Miyamoto et al. |
| 2005/0227762 A1 * | 10/2005 | Tahara et al. ................. 463/30 |
| 2006/0128468 A1 * | 6/2006 | Yoshikawa et al. ............ 463/36 |

FOREIGN PATENT DOCUMENTS

GB 2 390 308 A 1/2004
JP A 2000-237133 9/2000

* cited by examiner

*Primary Examiner*—Stephen G Sherman
(74) *Attorney, Agent, or Firm*—Oliff & Berridge, PLC

(57) ABSTRACT

An input evaluation system for evaluating an operation input of an operator, including: a drawing section which generates an image which seems to have a depth, a first moving object moving in an object space in the image; an information acquisition section which acquires operation information from an operation section which detects at least one of an operation direction, an amount of operation, and an operation speed of the operator for an operation target while the image is displayed in a first display area; a movement processing section which calculates at least one of a moving direction, a moving amount, and a moving velocity of a second moving object based on the operation information, and controls movement of the second moving object in the object space; and an evaluation section which evaluates the operation input of the operator based on a positional relationship between the first moving object and the second moving object in the object space.

13 Claims, 12 Drawing Sheets

PROGRAM, INPUT EVALUATION SYSTEM, AND INPUT EVALUATION METHOD

Japanese Patent Application No. 2006-177726, filed on Jun. 28, 2006, is hereby incorporated by reference in its entirety.

BACKGROUND OF THE INVENTION

The present invention relates to a program, an input evaluation system, and an input evaluation method.

In recent years, a visual capability required for sports has attracted attention. As examples of such a visual capability, kinetic vision acuity which is the capability of following a moving object with the eyes, eye movement which is the capability of quickly moving the eyes, peripheral vision which is the capability of ensuring a wide visual field, a visual reaction time which is the capability of instantaneously recognizing an object viewed, and the like can be given.

A visual capability measurement device which can improve the visual capability has been known which allows the operator to input the type of pattern (e.g. numeral or alphabetic character) displayed on a monitor using a keyboard, and compares the type of pattern input using the keyboard with the type of pattern displayed on the monitor to determine whether or not the types of patterns coincide.

In such a related-art visual capability measurement device, a numeral, an alphabetic character, or the like is merely displayed on the monitor, and the operator inputs the corresponding numeral or the like using the keyboard. Therefore, the operator cannot develop the visual capability while imagining a situation during an actual sport such as soccer, baseball, or American football.

Moreover, it is not interesting to the operator to read a numeral or an alphabetic character randomly displayed. Therefore, the operator loses interest in training.

In the related-art visual capability measurement device, the operator performs an operation input using an operation button or the keyboard. However, since the operator must carefully observe the image displayed on the screen, it is difficult for the operator to sufficiently input information necessary for the visual capability measurement using the operation button or the keyboard.

SUMMARY

According to a first aspect of the invention, there is provided a program stored in a computer-readable information storage medium and used for evaluating an operation input of an operator, the program causing a computer to function as:

a drawing section which generates an image which seems to have a depth, a first moving object moving in an object space in the image;

an information acquisition section which acquires operation information from an operation section which detects at least one of an operation direction, an amount of operation, and an operation speed of the operator for an operation target while the image is displayed in a first display area;

a movement processing section which calculates at least one of a moving direction, a moving amount, and a moving velocity of a second moving object based on the operation information, and controls movement of the second moving object in the object space; and an evaluation section which evaluates the operation input of the operator based on a positional relationship between the first moving object and the second moving object in the object space.

According to a second aspect of the invention, there is provided a program stored in a computer-readable information storage medium and used for evaluating an operation input of an operator, the program causing a computer to function as:

a drawing section which generates an image which seems to have a depth, a first moving object moving in an object space in the image;

an information acquisition section which acquires operation information from an operation section while the image is displayed in a first display area;

a movement processing section which calculates at least one of a moving direction, a moving amount, and a moving velocity of a second moving object based on the operation information acquired within a given time limit, and controls movement of the second moving object in the object space; and an evaluation section which evaluates the operation input of the operator based on a positional relationship between the first moving object and the second moving object in the object space.

According to a third aspect of the invention, there is provided an input evaluation system for evaluating an operation input of an operator, comprising:

a drawing section which generates an image which seems to have a depth, a first moving object moving in an object space in the image;

an information acquisition section which acquires operation information from an operation section which detects at least one of an operation direction, an amount of operation, and an operation speed of the operator for an operation target while the image is displayed in a first display area;

a movement processing section which calculates at least one of a moving direction, a moving amount, and a moving velocity of a second moving object based on the operation information, and controls movement of the second moving object in the object space; and an evaluation section which evaluates the operation input of the operator based on a positional relationship between the first moving object and the second moving object in the object space.

According to a fourth aspect of the invention, there is provided an input evaluation system for evaluating an operation input of an operator, comprising:

a drawing section which generates an image which seems to have a depth, a first moving object moving in an object space in the image;

an information acquisition section which acquires operation information from an operation section while the image is displayed in a first display area;

a movement processing section which calculates at least one of a moving direction, a moving amount, and a moving velocity of a second moving object based on the operation information acquired within a given time limit, and controls movement of the second moving object in the object space; and an evaluation section which evaluates the operation input of the operator based on a positional relationship between the first moving object and the second moving object in the object space.

According to a fifth aspect of the invention, there is provided an input evaluation method for evaluating an operation input of an operator, the method comprising:

generating an image which seems to have a depth, a first moving object moving in an object space in the image;

acquiring operation information from an operation section which detects at least one of an operation direction, an amount of operation, and an operation speed of the operator for an operation target while the image is displayed in a first display area;

calculating at least one of a moving direction, a moving amount, and a moving velocity of a second moving object based on the operation information, and controlling movement of the second moving object in the object space; and evaluating the operation input of the operator based on a positional relationship between the first moving object and the second moving object in the object space.

According to a sixth aspect of the invention, there is provided an input evaluation method for evaluating an operation input of an operator, the method comprising:

generating an image which seems to have a depth, a first moving object moving in an object space in the image;

acquiring operation information from an operation section while the image is displayed in a first display area;

calculating at least one of a moving direction, a moving amount, and a moving velocity of a second moving object based on the operation information acquired within a given time limit, and controlling movement of the second moving object in the object space; and evaluating the operation input of the operator based on a positional relationship between the first moving object and the second moving object in the object space.

DETAILED DESCRIPTION OF THE EMBODIMENT

Figure 1:
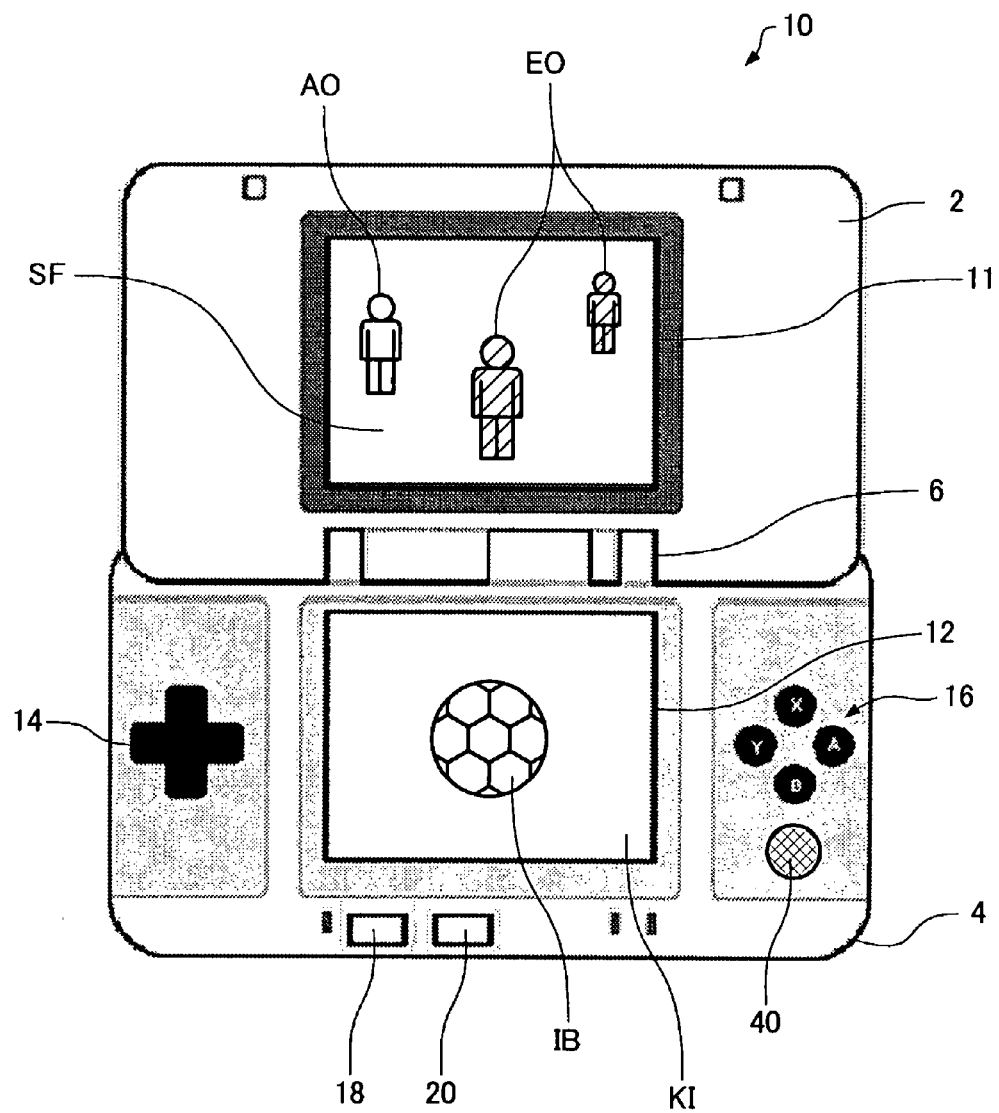
FIG. 1 is a view schematically showing an example of the outside appearance of a system according to one embodiment of the invention.
Figure 1:
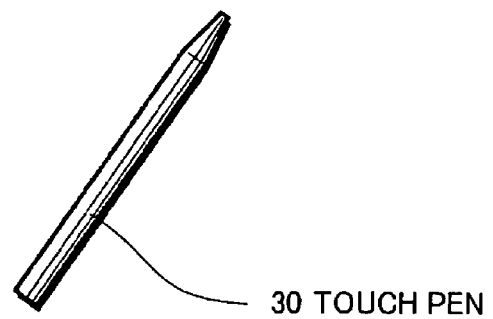

The invention may provide a program, an input evaluation system, and an input evaluation method enabling visual capability training which conforms to the actual situation and does not cause the operator to lose interest.

(1) According to one embodiment of the invention, there is provided a program stored in a computer-readable information storage medium and used for evaluating an operation input of an operator, the program causing a computer to function as:

a drawing section which generates an image which seems to have a depth, a first moving object moving in an object space in the image;

an information acquisition section which acquires operation information from an operation section which detects at least one of an operation direction, an amount of operation, and an operation speed of the operator for an operation target while the image is displayed in a first display area;

a movement processing section which calculates at least one of a moving direction, a moving amount, and a moving velocity of a second moving object based on the operation information, and controls movement of the second moving object in the object space; and an evaluation section which evaluates the operation input of the operator based on a positional relationship between the first moving object and the second moving object in the object space.

According to one embodiment of the invention, there is provided an input evaluation system comprising the above-described sections. According to one embodiment of the invention, there is provided a computer-readable information storage medium storing a program causing a computer to function as the above-described sections.

In the above embodiment, the term "operation target" refers to a target which is operated by the operator and of which the amount of operation and the operation direction are changed by the operator. For example, when the operation section detects the contact position of the operator such as a touch panel, the operation target may be an indication tool such as a touch pen for the operator to specify the contact position or part of the body of the operator such as the tip of the finger. When the operation section is a trackball or the like by which the operator changes the amount of operation (amount of rotation) and the operation direction (rotation direction) of the operating means (ball) of the operation section, the operation target may be the operating means (ball).

According to the above embodiment, since the operator performs an operation input while observing the moving state of the first moving object and the operation input is evaluated, the operator's visual capability of determining the movement of an object can be evaluated. Therefore, the above embodiment allows the operator to develop the visual capability of determining the movement of an object.

According to the above embodiment, at least one of the moving direction, the moving amount, and the moving velocity of the second moving object is calculated from the operation information about at least one of the operation direction, the amount of operation, and the operation velocity of the operator for the operation target. Specifically, the second moving object is moved in the object space based on changes in the operation direction, the amount of operation, and the operation velocity of the operator for the operation target. Therefore, since the above embodiment allows the operator who observes the image in which the first moving object moves to perform an intuitive operation input, the operator can perform an appropriate operation input relating to the movement of the second moving object while concentrating on observing the moving state of the first moving object.

According to the above embodiment, since the operator can concentrate on observing the moving state of the first moving object, the operator can effectively improve the visual capability (e.g. sports vision) of determining the movement of an object. According to the above embodiment, since the operator can perform the operation input for moving the second moving object by making a movement similar to that of moving the actual object, the operator can develop the visual capability such as sports vision while imagining the situation in the actual sport or the like. Therefore, the above embodiment enables visual capability training which conforms to the actual situation and does not cause the operator to lose interest.

(2) In each of the above input evaluation system, program, and information storage medium, the information acquisition section may acquire contact operation position information for at least two points in a contact detection area in which a contact operation of the operator is detected while the image is displayed in the first display area; and the movement processing section may calculate at least one of the moving direction, the moving amount, and the moving velocity of the second moving object based on the contact operation position information for at least two points.

According to the above embodiment, at least one of the moving direction, the moving amount, and the moving velocity of the second moving object is calculated based on the contact operation position information for at least two points in the contact detection area. Specifically, the second moving object is moved in the object space based on the movement of the contact operation position of the operator. Therefore, the above embodiment allows at least one of the moving direction, the moving amount, and the moving velocity of the second moving object to be calculated with a reduced processing load while allowing the operator who observes the image in which the first moving object moves to perform an intuitive operation input.

(3) In each of the above input evaluation system, program, and information storage medium, the information acquisition section may acquire contact operation time information indicating a period of time from acquisition of first contact operation position information to acquisition of second contact operation position information of the contact operation position information for at least two points; and the movement processing section may calculate at least one of the moving direction, the moving amount, and the moving velocity of the second moving object based on the contact operation position information for at least two points and the contact operation time information.

According to the above embodiment, since the second moving object is moved in the object space taking into account the moving time of the contact operation position in addition to the movement of the contact operation position of the operator, it is possible to perform detailed control which further reflects the operation of the operator in the movement of the second moving object while maintaining an intuitive operation input.

(4) In each of the above input evaluation system, program, and information storage medium, the drawing section may generate an image which seems to have a depth based on priority set for each of the first moving objects.

It is desirable that an image used for visual capability training be an image of a space with a depth similar to the actual space. However, since the space with a depth must be expressed by a virtual third-dimensional space, the drawing load is increased.

According to the above embodiment, an image which represents a pseudo-depth is generated in a two-dimensional space, and the operator performs an operation for moving the second moving object (e.g. ball object) while observing the image displayed to have a depth. This enables visual capability training in a situation closer to the actual situation. Moreover, the drawing process using the two-dimensional space can save a memory and a storage area and reduce processing load.

(5) Each of the above input evaluation system, program, and information storage medium may further cause the computer to function as:

an object space setting section which sets the first moving object and the second moving object in the object space, wherein the drawing section generates an image in which the object space is viewed from a given view point.

According to the above embodiment, since an image of a space with a depth is generated in the same manner as the actual space, the operator can develop the visual capability in a situation closer to the actual situation.

(6) In each of the above input evaluation system, program, and information storage medium, the drawing section may generate an image to be displayed in a second display area corresponding to the contact detection area.

According to the above embodiment, an image which directs the operator to perform the operation input can be displayed corresponding to the contact detection area. Therefore, the above embodiment allows issuance of an intuitive contact operation instruction to the operator.

(7) Each of the above input evaluation system, program, and information storage medium may further cause the computer to function as:

a display control section which displays a plurality of operation instruction indications in the second display area, wherein the information acquisition section acquires the contact operation position information corresponding to each of the operation instruction indications; and wherein the movement processing section calculates at least one of the moving direction, the moving amount, and the moving velocity of the second moving object based on the acquired contact operation position information.

According to the above embodiment, since various types of information for moving the second moving object can be acquired by issuing an intuitive contact operation instruction to the operator, the second moving object can be moved while further reflecting the intention of the operator.

(8) In each of the above input evaluation system, program, and information storage medium, the movement processing section may calculate at least one of the moving direction, the moving amount, and the moving velocity of the second moving object based on an intersection area of a determination area set in the contact detection area and a contact operation path of the operator in the contact detection area.

According to the above embodiment, since the operator can perform an operation taking into account the determination area, the operator can develop the visual capability while imagining the situation in the actual sport or the like, whereby training is enabled which conforms to the actual situation and does not cause the operator to lose interest.

(9) In each of the above input evaluation system, program, and information storage medium, the movement processing section may calculate at least one of the moving direction, the moving amount, and the moving velocity of the second moving object based on a starting point and an end point of the intersection area.

According to the above embodiment, since at least one of the moving direction, the moving amount, and the moving velocity of the second moving object can be calculated with a small amount of information such as the contact operation position information of the starting point and the end point of the intersection area, processing load can be reduced, and the storage area can be saved.

(10) In each of the above input evaluation system, program, and information storage medium, the movement processing section may calculate at least one of the moving direction, the moving amount, and the moving velocity of the second moving object based on properties of the contact operation path.

According to the above embodiment, the movement of the second moving object can be controlled corresponding to the properties of the contact operation path. Therefore, the second moving object can be moved while further reflecting the intention of the operator.

(11) In each of the above input evaluation system, program, and information storage medium, the movement processing section may not control the movement of the second moving object when the contact operation path has a length smaller than a predetermined value.

According to the above embodiment, since the movement of the second moving object is not controlled when the contact operation path has a length shorter than a predetermined value, movement control due to an erroneous touch of the operator can be prevented. Therefore, movement control can be performed for only information recognized as an input.

(12) In each of the above input evaluation system, program, and information storage medium, the movement processing section may control the movement of the second moving object based on the operation information acquired within a given time limit.

According to the above embodiment, since the operator must perform the operation within a given time limit, the operator can develop the visual reaction time capability for instantaneously recognizing the moving state of the first moving object and judgment capability. Moreover, since the difficulty can be adjusted by changing the time limit, training corresponding to the level of the operator can be achieved.

(13) Each of the above input evaluation system, program, and information storage medium may further cause the computer to function as:

a hit check section which performs a hit check between the first moving object and the second moving object in the object space, wherein the evaluation section evaluates the operation input of the operator based on a result of the hit check.

According to the above embodiment, since the operation input of the operator is evaluated based on the hit check result, the operator can easily understand the evaluation standard. Therefore, the operator can appropriately perform the operation input for obtaining a favorable (good) evaluation.

(14) In each of the above input evaluation system, program, and information storage medium, the evaluation section may evaluate the operator based on at least one of the moving amount and the moving velocity of the second moving object.

According to the above embodiment, the operation input of the operator can be evaluated taking into account whether or not the moving amount and the moving velocity of the second moving object are appropriate in addition to the hit check result indicating whether or not the second moving object has hit the first moving object. Therefore, since the operator is required to have judgment capability and operation input skill, interest to the operator is increased, whereby the operator can continue developing visual capability.

(15) According to one embodiment of the invention, there is provided a program stored in a computer-readable information storage medium and used for evaluating an operation input of an operator, the program causing a computer to function as:

a drawing section which generates an image which seems to have a depth, a first moving object moving in an object space in the image;

an information acquisition section which acquires operation information from an operation section while the image is displayed in a first display area;

a movement processing section which calculates at least one of a moving direction, a moving amount, and a moving velocity of a second moving object based on the operation information acquired within a given time limit, and controls movement of the second moving object in the object space; and an evaluation section which evaluates the operation input of the operator based on a positional relationship between the first moving object and the second moving object in the object space.

According to one embodiment of the invention, there is provided an input evaluation system comprising the above-described sections. According to one embodiment of the invention, there is provided a computer-readable information storage medium storing a program causing a computer to function as the above-described sections.

According to the above embodiment, since the movement of the second moving object is controlled based on the operation information acquired within a given time limit to evaluate the operation input of the operator, the operator is required to perform a quick and accurate operation input. Therefore, since the operator must perform the operation within a given time limit, the operator can develop visual reaction time capability for instantaneously recognizing the moving state of the first moving object and judgment capability. Moreover, since the difficulty can be adjusted by changing the time limit, training corresponding to the level of the operator can be achieved.

(16) According to one embodiment of the invention, there is provided an input evaluation method for evaluating an operation input of an operator, the method comprising:

generating an image which seems to have a depth, a first moving object moving in an object space in the image;

acquiring operation information from an operation section which detects at least one of an operation direction, an amount of operation, and an operation speed of the operator for an operation target while the image is displayed in a first display area;

calculating at least one of a moving direction, a moving amount, and a moving velocity of a second moving object based on the operation information, and controlling movement of the second moving object in the object space; and evaluating the operation input of the operator based on a positional relationship between the first moving object and the second moving object in the object space.

(17) According to one embodiment of the invention, there is provided an input evaluation method for evaluating an operation input of an operator, the method comprising:

generating an image which seems to have a depth, a first moving object moving in an object space in the image;

acquiring operation information from an operation section while the image is displayed in a first display area;

calculating at least one of a moving direction, a moving amount, and a moving velocity of a second moving object based on the operation information acquired within a given time limit, and controlling movement of the second moving object in the object space; and evaluating the operation input of the operator based on a positional relationship between the first moving object and the second moving object in the object space.

Some embodiments of the invention will be described below. Note that the embodiments described below do not unduly limit the scope of the invention laid out in the claims herein. In addition, not all of the elements of the embodiments described below should be taken as essential requirements of the invention.

1. Summary

FIG. 1 is an outside view of a game system according to one embodiment of the invention. In a portable game system 10 according to this embodiment, a main body upper portion 2 and a main body lower portion 4 are connected through a hinge portion 6 so that the main body upper portion 2 and the main body lower portion 4 can be rotated around the hinge axis. The main body upper portion 2 includes a first display 11, and the main body lower portion 4 includes a second display 12. In this embodiment, the angle formed by the screen of the first display 11 and the screen of the second display 12 can be changed accordingly. The main body lower portion 4 also includes an operation section such as an arrow key 14, an operation button 16, a start button 18, and a select button 20, and a sound input device 40 (microphone) which allows the operator to input sound (voice).

In this embodiment, the second display 12 is formed by stacking a liquid crystal display and a touch panel so that the contact operation position of the operator in the display area of the second display 12 can be detected. In this embodiment, the operator performs a contact operation for the second display 12 using a touch pen 30, and the contact operation position is detected.

In this embodiment, an image in which an enemy object EO and an ally object AO (first moving object) move in an object space and which has a depth is displayed on the first display 11. An image of an operation instruction soccer ball IB is displayed on the second display 12 as a contact operation instruction indication for the operator. In this embodiment, the moving state of the enemy object EO and the ally object AO in a soccer field SF viewed from the operator is displayed on the first display 11, and the operation instruction soccer ball IB at the operator's feet viewed from the operator is displayed on the second display 12.

In this embodiment, the moving direction, the moving amount, and the moving velocity of a soccer ball (second moving object) displayed on the first display 11 are calculated as the results of the operation input based on the intersection area of the region of the second display 12 in which the operation instruction soccer ball IB is displayed and the operator's contact operation path using the touch pen 30. An image in which the soccer ball moves is displayed on the first display 11, and a hit check with the enemy object EO and the ally object AO is performed to determine whether or not the operator has appropriately passed the soccer ball to the ally object AO.

2. Configuration

Figure 2:
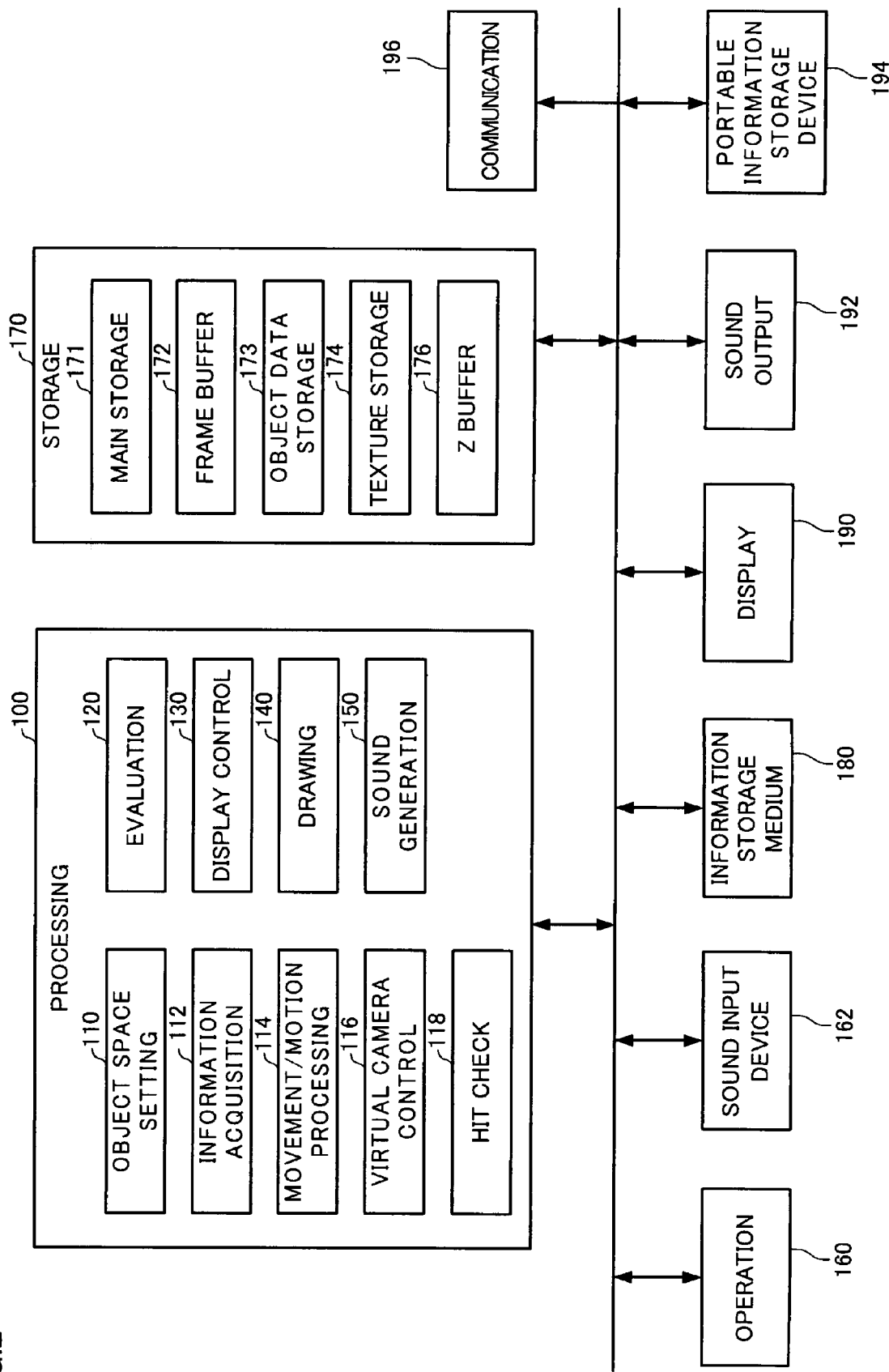
FIG. 2 is a view showing an example of functional blocks according to one embodiment of the invention.

The configuration of an input evaluation system (image generation system or game system) according to this embodiment is described below with reference to FIG. 2. FIG. 2 is an example of a functional block diagram of the input evaluation system according to this embodiment. The input evaluation system according to this embodiment may have a configuration in which some of the elements (sections) shown in FIG. 2 are omitted.

An operation section 160 allows the player to input operation data. The function of the operation section 160 may be implemented by a lever, a button, a steering wheel, a microphone, a touch panel display, a trackball, a casing, or the like.

In this embodiment, the second display 12 shown in FIG. 1 is a touch panel display in which a liquid crystal display and a touch panel for detecting the contact position of the operator are stacked. Therefore, the second display 12 according to this embodiment functions as the operation section 160 and a display section. The player may perform the contact operation for the second display 12 using an input device such as the touch pen 30 shown in FIG. 1 or with the tip of the finger.

A trackball or the like by which the player changes the amount of operation (amount of rotation) and the operation direction (rotation direction) of the operating means (ball) of the operation section may function as the operation section 160. The trackball allows the player to perform the operation input by rolling a ball provided on the top surface of the device. The ball can be rotated around its center in all directions, and the player to can perform the operation input by adjusting the rotation direction, the rotation amount, and the rotational speed. The ball can be rolled with the tip of the finger.

A sound input device 162 allows the player to input sound such as voice or a clap. The function of the sound input device 162 may be implemented by a microphone or the like. The player may perform the operation by inputting voice to the sound input device 162.

A storage section 170 serves as a work area for a processing section 100, a communication section 196, and the like. The function of the storage section 170 may be implemented by a RAM (VRAM) or the like. The storage section 170 according to this embodiment includes a main storage section 171 used as a work area, a frame buffer 172 in which the final display image and the like are stored, an object data storage section 173 in which model data of an object is stored, a texture storage section 174 in which the texture for each piece of object data is stored, and a Z buffer 176 in which a Z value is stored when generating an image of an object. Note that the storage section 170 may have a configuration in which some of these sections are omitted.

In the storage section 170 according to this embodiment, contact operation position information acquired by an information acquisition section 112 may be stored in the main storage section 171. The display priority of the first moving object may be stored in the object data storage section 173.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

A program (data) for causing the processing section 100 to perform various processes according to this embodiment is stored in the information storage medium 180. Specifically, a program for causing a computer to function as each section according to this embodiment (program for causing a computer to perform the process of each section) is stored in the information storage medium 180.

A display section 190 outputs an image generated according to this embodiment. The function of the display section 190 may be implemented by a CRT, an LCD, a touch panel display, a head mount display (HMD), or the like. In this embodiment, the display section 190 includes the first display 11 and the second display 12, and the second display 12 also functions as the operation section 160 for the player to perform the game operation using a touch panel display. As the touch panel, a touch panel using a resistive film method (four-wire type or five-wire type), an electrostatic capacitive coupling method, an ultrasonic surface acoustic wave method, an infrared scanning method, or the like may be used.

When the input evaluation system includes two displays, at least the second display 12 may be configured as a touch panel display. A first display area and a second display area may be provided in one display, and at least the second display area may be allowed to function as the detection area in which the contact operation position is detected.

A sound output section 192 outputs sound generated according to this embodiment. The function of the sound output section 192 may be implemented by a speaker, a headphone, or the like.

A portable information storage device 194 stores player's personal data, game save data, and the like. As the portable information storage device 194, a memory card, a portable game device, and the like can be given.

A communication section 196 performs various types of control for communicating with the outside (e.g. host device or another input evaluation system). The function of the communication section 196 may be implemented by hardware such as a processor or a communication ASIC, a program, or the like.

The program (data) for causing a computer to function as each section according to this embodiment may be distributed to the information storage medium 180 (storage section 170) from an information storage medium included in a host device (server) through a network and the communication section 196. Use of the information storage medium of the host device (server) is also included within the scope of the invention.

The processing section 100 (processor) performs a game process, an image generation process, a sound generation process, and the like based on operation data from the operation section 160, a program, and the like. The game process includes a process of starting a game when game start conditions have been satisfied, a process of proceeding with a game, a process of disposing an object such as a character or a map, a process of displaying an object, a process of calculating game results, a process of finishing a game when game end conditions have been satisfied, and the like. The processing section 100 performs various processes using the storage section 170 as a work area. The function of the processing section 100 may be implemented by hardware such as a processor (e.g. CPU or DSP) or an ASIC (e.g. gate array) and a program.

The processing section 100 according to this embodiment includes an object space setting section 110, a virtual camera control section 111, an information acquisition section 112, a movement/motion processing section 114, a hit check section 118, an evaluation section 120, a display control section 130, a drawing section 140, and a sound generation section 150. Note that the processing section 100 may have a configuration in which some of these sections are omitted.

The object space setting section 110 disposes (sets) various objects (objects formed by a primitive surface such as a sprite, a billboard, a polygon, a free-form surface, or a subdivision surface) representing display objects such as a moving object (e.g. enemy object, ally object, or ball object), a building, a tree, a pillar, a wall, or a map (topography) in an object space with a pseudo-depth. Specifically, the object space setting section 110 determines the position and the rotational angle (synonymous with orientation or direction) of an object (model object), and disposes the object at the determined position (X, Y, Z) and the determined rotational angle (rotational angles around X, Y, and Z axes). The object space setting section 110 according to this embodiment sets the first moving object and the second moving object in the object space.

The term "object space with a pseudo-depth" includes a virtual two-dimensional space and a virtual three-dimensional space. The two-dimensional space is a space in which the object is disposed at two-dimensional coordinates (X,Y), and the three-dimensional space is a space in which the object is disposed at three-dimensional coordinates (X, Y, Z), for example.

When the object space is a two-dimensional space, the object space setting section 110 disposes the object based on the priority set for each object. For example, the object space setting section 110 may dispose the object in the order from the object (sprite) placed at the deepest position, and dispose the object placed on the front side over the object which has been disposed.

Figure 3A:
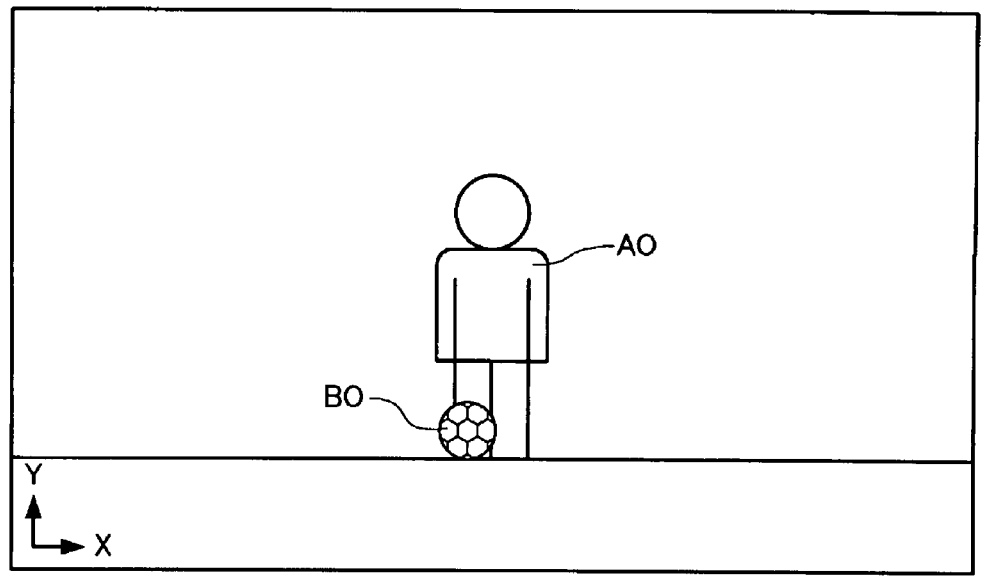
FIGS. 3A and 3B are views illustrative of an image displayed to have a depth according to one embodiment of the invention.
Figure 3B:
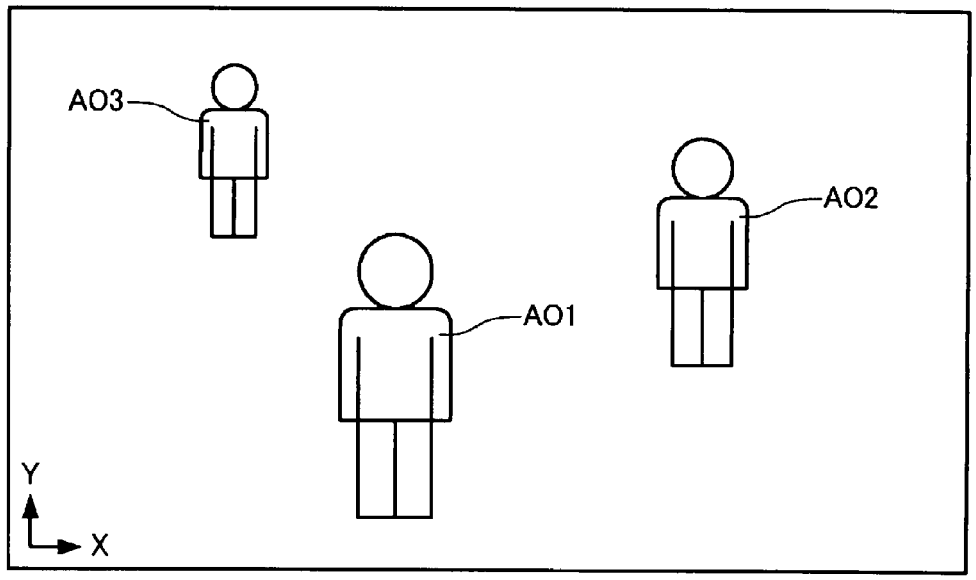

It is possible to create an image in which the object space corresponding to the upper side of the screen is disposed at a deeper position and the object space corresponding to the lower side of the screen is disposed on the front side by disposing the object with a large drawing size on the lower side of the image and disposing the object with a small drawing size on the upper side of the image. As shown in FIG. 3A, when creating an image in which a ball object BO is disposed on the front side and the ally object AO is disposed at a deeper position, the ally object AO is disposed first, and the ball object BO is disposed over the ally object AO, for example. As shown in FIG. 3B, an ally object AO1 with a large drawing size is disposed on the lower side of the image, an ally object AO2 with a drawing size smaller than that of the ally object AO1 is disposed at the center of the image, and an ally object AO3 with a drawing size smaller than that of the ally object AO2 is disposed on the upper side of the image. This enables an image with a depth to be generated.

When the object space is a three-dimensional space, the object is disposed in a world coordinate system to generate an image which is viewed from a given view point and has a depth. In this case, the virtual camera control section 112 controls a virtual camera (view point) for generating an image viewed from a given (arbitrary) view point in the object space. In more detail, the virtual camera control section 112 controls the position (X, Y, Z) or the rotational angle (rotational angles around X, Y, and Z axes) of the virtual camera (controls the view point position or the line-of-sight direction).

For example, when imaging the object (e.g. character, ball, or car) from behind using the virtual camera, the virtual camera control section 112 controls the position or the rotational angle (orientation) of the virtual camera so that the virtual camera follows a change in position or rotation of the object. In this case, the virtual camera control section 112 may control the virtual camera based on information such as the position, rotational angle, or velocity of the object obtained by the movement/motion processing section 114. Or, the virtual camera control section 112 may rotate the virtual camera at a predetermined rotational angle or move the virtual camera along a predetermined path. In this case, the virtual camera control section 112 controls the virtual camera based on virtual camera data for specifying the position (path) or the rotational angle of the virtual camera. When a plurality of virtual cameras (view points) exist, the above-described control process is performed for each virtual camera.

The information acquisition section 112 identifies input information input by the player using the operation section 160 or the sound input device 162. In more detail, the information acquisition section 112 according to this embodiment acquires the operation information from the operation section while an image is displayed in the first display area. The operation information from the operation section may be information for calculating at least one of the operation direction, the amount of operation, and the operation velocity of the operator for the operation target. For example, when the operator performs the operation input using the trackball, the operation information may be the moving direction, the moving amount, and the moving velocity of the trackball. When the operator performs the operation input using the touch panel, the operation information may be information for calculating the moving direction, the moving amount, and the moving velocity of the touch pen, the tip of the finger of the operator, or the like used for performing the touch operation.

The operation velocity is calculated based on the time per unit amount of operation or the amount of operation per unit time. For example, the operation velocity may be calculated based on the period of time from the commencement of the operation input to the completion of the operation input when the operator performs one operation. The operation velocity may be calculated based on the period of time from the commencement to the completion of the operation input during a period in which the operation input can be performed. The operation velocity may be calculated based on the amount of operation by the operator within a specific period of time. For example, when the operator performs the operation input using the trackball, the operation velocity may be calculated based on the rotation amount of the ball per second.

The operation information may be the contact operation position information for at least two points in the contact detection area in which the contact operation of the operator is detected. The operation information may be contact operation time information indicating the period of time from the acquisition of first contact operation position information to the acquisition of second contact operation position information of the contact operation position information for at least two points in the contact detection area in which the contact operation of the operator is detected. The contact detection area in which the contact operation is detected may be the touch panel which detects the position of the touch operation (operation performed using the touch pen or the finger) of the operator, for example. In this embodiment, a tablet (input means) is provided over the display panel so that the touch position on the tablet is detected.

The movement/motion processing section 114 calculates the movement/motion (movement/motion simulation) of the moving object (e.g. first moving object and second moving object). Specifically, the movement/motion processing section 114 causes the moving object to move in the object space or controls the movement (motion or animation) of the moving object based on the operational data input by the player using the operation section 160, a set parameter or attribute, a program (movement/motion algorithm), various types of data (motion data), and the like.

In more detail, the movement/motion processing section 114 according to this embodiment performs a simulation process of sequentially calculating movement information (moving direction, moving amount, moving velocity, position, rotational angle, or acceleration) and motion information (position or rotational angle of each part object) of the object in frame (e.g. 1/60 sec) units. The term "frame" refers to a time unit for performing the object movement/motion process (simulation process) and the image generation process. In this embodiment, the frame rate may be fixed in each frame, or may be changed depending on the processing load. In this embodiment, the movement/motion processing section 114 controls the movement of the enemy object and the ally object in the first display area based on a program.

The movement/motion processing section 114 according to this embodiment calculates at least one of the moving direction, the moving amount, and the moving velocity of the second moving object based on the operation information, and controls the movement of the second moving object in the object space. For example, when using the trackball, the movement/motion processing section 114 may calculate the moving direction, the moving amount, and the moving velocity of the second moving object based on the moving direction, the moving amount, and the moving velocity of the trackball. The movement/motion processing section 114 may calculate at least one of the moving direction, the moving amount, and the moving velocity of the second moving object based on the contact operation position information for at least two points detected in the contact detection area, and control the movement of the second moving object in the object space. The contact operation position information is position information obtained from the contact detection area by the contact operation of the operator. The movement/motion processing section 114 may calculate at least one of the moving direction, the moving amount, and the moving velocity of the second moving object based on the contact operation position information and the contact operation time information indicating the period of time from the acquisition of the first contact operation position information to the acquisition of the second contact operation position information of the contact operation position information for at least two points, and control the movement of the second moving object in the object space. The contact operation time information is time information indicating the period of time from the acquisition of the first position information to the acquisition of the second position information in the contact detection area by the contact operation of the operator.

The movement/motion processing section 114 according to this embodiment may calculate at least one of the moving direction, the moving amount, and the moving velocity of the second moving object based on the intersection area of a determination area set in the contact detection area and the operator's contact operation path in the contact detection area. The determination area set in the contact detection area is the range in the contact detection area which specifies the contact operation position information processed by the movement control from the acquired contact operation position information. The contact operation path refers to the path (line) caused by the contact between the touch pen and the touch panel during a period in which the touch pen (e.g. input device or finger) contacts the touch panel (contact detection area) and is removed from the touch panel. The intersection area is the contact operation path in the determination area set in the contact detection area.

The movement/motion processing section 114 according to this embodiment may calculate at least one of the moving direction, the moving amount, and the moving velocity of the second moving object based on the starting point and the end point of the intersection area. The starting point and the end point of the intersection area refer to the starting point and the end point of the path which is the intersection area.

The movement/motion processing section 114 according to this embodiment may calculate at least one of the moving direction, the moving amount, and the moving velocity of the second moving object based on the properties of the contact operation path. The properties of the contact operation path refer to a straight line, a depressed curve, a circle, a triangle, a pattern with a star mark, and the like formed by the path of the intersection area.

The movement/motion processing section 114 according to this embodiment may not control the movement of the second moving object when the contact operation path has a length smaller than a predetermined value. The length of the contact operation path includes the length of a straight line and the length of a curve.

The movement/motion processing section 114 according to this embodiment may control the movement of the second moving object based on the operation information acquired within a given time limit. The movement/motion processing section 114 may control the movement of the second moving object based on the contact operation position information for at least two points acquired within a given time limit. The time limit may be appropriately changed when repeatedly playing the game (check or measurement).

The movement/motion processing section 114 according to this embodiment may set a parameter such as a moving distance based on the contact operation position information, and calculate the moving direction, the moving amount, and the moving velocity of the second moving object in the object space based on the parameter. The movement/motion processing section 114 according to this embodiment may use the two-dimensional coordinates P1(X1,Y1) and P2(X2,Y2) of two points as the contact operation position information, and use the period of time from the acquisition of the two-dimensional coordinates P1(X1, Y1) to the acquisition of the two-dimensional coordinate P2(X2,Y2) as the contact operation time information. The movement/motion processing section 114 may calculate the moving direction, the moving amount, and the moving velocity of the second moving object based on the two-dimensional coordinates P1 and P2 (contact operation position information) and the contact operation time information. For example, the direction from the two-dimensional coordinates P1 to the two-dimensional coordinates P2 may be associated with the moving direction of the second moving object, or the length of the line segment connecting the two-dimensional coordinates P1 and the two-dimensional coordinates P2 may be associated with the moving amount of the second moving object. The moving velocity of the second moving object may be calculated based on the length of the line segment connecting the two-dimensional coordinates P1 and the two-dimensional coordinates P2. The moving velocity of the second moving object may be calculated based on the line segment connecting the two-dimensional coordinates P1 and the two-dimensional coordinates P2 and the contact operation time information. The moving velocity of the second moving object may be changed corresponding to the velocity of the operation input by the contact operation of the operator.

When the movement/motion processing section 114 according to this embodiment controls the movement of the second moving object in a two-dimensional space, the movement/motion processing section 114 may control the display priority of the object so that the two-dimensional space is displayed to have a depth. When the movement/motion processing section 114 according to this embodiment controls the movement of the second moving object in a three-dimensional space, the movement/motion processing section 114 may control the movement of the second moving object by converting the two-dimensional coordinates P1 and P2 into three-dimensional coordinates.

The hit check section 118 performs a hit check between the first moving object and the second moving object in the object space. The hit check section 118 performs a hit check by determining whether or not the first moving object has hit (coincides in position with) the second moving object. The hit check section 118 according to this embodiment may perform a hit check in a state in which a hit check range is set for the first moving object and the second moving object in advance.

When the object space is a two-dimensional space, the hit check section 118 may perform a hit check by determining whether or not one sprite corresponding to the first moving object has hit the other sprite corresponding to the second moving object. When the object space is a three-dimensional space, the hit check section 118 may perform a hit check by determining whether or not a polygon or a bounding volume has hit another polygon or bounding volume.

The evaluation section 120 evaluates the operation input of the operator based on the positional relationship between the first moving object and the second moving object in the object space. For example, evaluation corresponding to the distance between the first moving object and the second moving object is set in an evaluation table in advance. The evaluation section 120 calculates the distance between the first moving object and the second moving object based on the positional relationship between the first moving object and the second moving object, and acquires the evaluation corresponding to the distance from the evaluation table as the evaluation of the operation input of the operator.

The evaluation section 120 may evaluate the operation input of the operator based on the hit check result. The evaluation section 120 according to this embodiment makes an unfavorable evaluation such as decrementing the score when the second moving object has hit the enemy object, and makes a favorable evaluation such as incrementing the score when the second moving object has hit the ally object.

The evaluation section 120 may evaluate the operator based on at least one of the moving amount and the moving velocity of the second moving object. For example, even if the second moving object has hit the ally object, the evaluation section 120 may make an unfavorable evaluation when the distance between the second moving object and the ally object is too short or the moving velocity of the second moving object when hitting the ally object is too high.

The display control section 130 displays a plurality of operation instruction indications in the display area. The display control section 130 according to this embodiment may display a plurality of operation instruction indications in the second display area. The operation instruction indication is an instruction indication of the contact operation for moving the second moving object in the object space, and is an image which prompts the operator to issue operation instructions. For example, the operation instruction indication may be an image showing the second moving object such as a soccer ball.

The display control section 130 may display a plurality of types of operation instruction indications. For example, information for determining the moving direction of the second moving object in detail may be acquired stepwise by a plurality of types of operation instruction indications. For example, the display control section 130 may display an operation instruction indication which accepts information for setting the angle of elevation as the moving direction of the ball, an operation instruction indication which specifies the kicking position of spiked shoes for kicking the ball object, and the like.

The drawing section 140 performs a drawing process based on the results of various processes (game processes) performed by the processing section 100 to generate an image, and outputs the generated image to the display 190. The image generated by the drawing section 140 may be a two-dimensional image or a three-dimensional image. The drawing section 140 according to this embodiment generates an image in which the first moving object moves in the object space and which is displayed to have a depth.

When the drawing section 140 generates a two-dimensional image, the drawing section 140 draws the object in the order from the first moving object with the lowest priority, and draws the object with a higher priority over the drawn object when the objects overlap.

When the drawing section 140 according to this embodiment generates a three-dimensional game image, the drawing section 140 receives object data (model data) including vertex data (e.g. vertex position coordinates, texture coordinates, color data, normal vector, or alpha value) of each vertex of the object (model), and performs a vertex process based on the vertex data included in the input object data. When performing the vertex process, the drawing section 140 may perform a vertex generation process (tessellation, curved surface division, or polygon division) for subdividing the polygon, if necessary.

In the vertex process, the drawing section 140 performs a vertex movement process and a geometric process such as coordinate transformation (world coordinate transformation or camera coordinate transformation), clipping, perspective transformation, or light source process, and changes (updates or adjusts) vertex data of the vertices forming the object based on the processing results. The drawing section 140 performs rasterization (scan conversion) based on the vertex data after the vertex process, whereby the surface of the polygon (primitive) is associated with pixels. The drawing section 140 then performs a pixel process (fragment process) of drawing pixels forming the image (fragments forming the display screen).

In the pixel process, the drawing section 140 determines the final drawing color of the pixel by performing various processes such as texture reading (texture mapping), color data setting/change, translucent blending, and anti-aliasing, and outputs (draws) the drawing color of the object subjected to perspective transformation to the frame buffer 174 (buffer which can store image information in pixel units; VRAM or rendering target). Specifically, the pixel process involves a per-pixel process which sets or changes the image information (e.g. color, normal, luminance, and alpha value) in pixel units.

This causes an image viewed from the virtual camera (given view point) set in the object space to be generated. When a plurality of virtual cameras (view points) exist, the image may be generated so that images viewed from the respective virtual cameras can be displayed on one screen as divided images.

The vertex process and the pixel process performed by the drawing section 140 may be implemented by hardware which enables a programmable polygon (primitive) drawing process (i.e. programmable shader (vertex shader and pixel shader)) according to a shader program created using shading language. The programmable shader enables a programmable per-vertex process and per-pixel process to increase the degrees of freedom of the drawing process, thereby significantly improving the representation capability in comparison with a fixed drawing process using hardware.

The drawing section 140 performs a geometric process, texture mapping, hidden surface removal, alpha blending, and the like when drawing the object.

In the geometric process, the drawing section 140 subjects the object to coordinate transformation, clipping, perspective projection transformation, light source calculation, and the like. The drawing section 140 stores the object data (e.g. object's vertex position coordinates, texture coordinates, color data (luminance data), normal vector, or alpha value) after the geometric process (after perspective transformation) in the storage section 170.

In texture mapping, the drawing section 140 maps a texture (texel value) stored in the texture storage section 174 of the storage section 170 onto the object. In more detail, the drawing section 140 reads a texture (surface properties such as color (RGB) and alpha value) from the texture storage section 174 of the storage section 170 using the texture coordinates set (assigned) to the vertices of the object and the like, and maps the texture (two-dimensional image) onto the object. In this case, the drawing section 140 performs a process of associating the pixels with the texels, bilinear interpolation (texel interpolation), and the like.

In this embodiment, the drawing section 140 may map a given texture when drawing the object. This allows the color distribution (texel pattern) of the texture mapped to be dynamically changed.

In this case, textures with different color distributions (pixel patterns) may be dynamically generated, or textures with different color distributions may be provided in advance and the texture used may be dynamically changed. The color distribution of the texture may be changed in object units.

The drawing section 140 performs hidden surface removal by a Z buffer method (depth comparison method or Z test) using the Z buffer (depth buffer) in which the Z value (depth information) of the drawing pixel is stored. Specifically, the drawing section 140 refers to the Z value stored in the Z buffer when drawing the drawing pixel corresponding to the primitive of the object, and compares the Z value referred to with the Z value of the drawing pixel of the primitive. When the Z value of the drawing pixel is a Z value in front when viewed from the virtual camera (e.g. small Z value), the drawing section 140 draws the drawing pixel and updates the Z value stored in the Z buffer with a new Z value.

In alpha blending, the drawing section 140 performs translucent blending (e.g. normal alpha blending, additive alpha blending, or subtractive alpha blending) based on the alpha value (A value). The alpha value is information which can be stored while being associated with each pixel (texel or dot), such as additional information other than the color information. The alpha value may be used as mask information, translucency (equivalent to transparency or opacity), bump information, or the like.

The drawing section 140 according to this embodiment may generate an image displayed in the second display area corresponding to the contact detection area. The image displayed in the second display area may be an image including the second moving object, for example.

The sound generation section 150 processes sound based on the results of various processes performed by the processing section 100 to generate game sound such as background music (BGM), effect sound, or voice, and outputs the generated game sound to the sound output section 192.

The input evaluation system according to this embodiment may be configured as a system dedicated to a single-player mode in which only one player can play a game, or a system which is also provided with a multiplayer mode in which a number of players can play a game.

When a number of players play a game, game images and game sound provided to the players may be generated using one terminal, or may be generated by a distributed process using two or more terminals (game devices or portable telephones) connected through a network (transmission line or communication line), for example.

3. Principle

In a related-art visual capability measurement device, the type of pattern (e.g. numeral or alphabetic character) displayed on the monitor is displayed on the screen. Therefore, it is difficult for the operator to imagine the situation in the actual sport or the like, whereby the operator tends to lose interest. Therefore, this embodiment employs a method of allowing the operator to develop the visual capability of determining the movement of an object by determining whether or not the operator has passed a ball to an ally in a soccer game. According to this embodiment, the operator can continuously enjoy developing the visual capability while imagining actually playing soccer.

In this embodiment, an image in which the ally object and the enemy object move is displayed in the first display area, and the ball object is displayed in the second display area. The image displayed in the first display area is an image with a depth viewed from the operator's view point. This is because it is advantageous for sports vision training to display an image viewed from the operator's view point in the same manner as in actual soccer play.

Since the second display area according to this embodiment is the touch panel display, the operator can perform an input operation for the touch panel using the touch pen or the like. Specifically, the operator searches for the direction in which the operator can appropriately pass the ball object to the ally object, and moves the ball object displayed in the second display area using the touch pen or the like.

The input evaluation system calculates the moving direction, the moving amount, and the moving velocity of the ball object based on the contact operation position information detected from the touch panel and the contact operation time information indicating the period of time from the acquisition of the first contact operation position information to the acquisition of the second contact operation position information. Specifically, the operator touches the touch panel using the touch pen, and the input evaluation system calculates the moving direction, the moving amount, and the moving velocity of the ball object based on the contact start position, the contact end position, the contact operation time, and the moving direction, the moving amount, and the moving velocity of the contact operation path. This allows the operator to operate the ball object using the touch pen instead of the foot. Moreover, the operator can easily perform the operation input using the touch pen or the like while carefully observing the image.

The operator can develop the sports vision capability such as eye movement and visual reaction time by determining the passing direction. Specifically, since the ally object and the enemy object move, the operator must operate the touch pen or the like while quickly moving the eyes. Therefore, the operator can develop the eye movement capability. Moreover, since the operator must instantaneously determine the positions, the moving direction, and the like of the ally object and the enemy object, the operator can improve the visual reaction time.

Figure 4A:
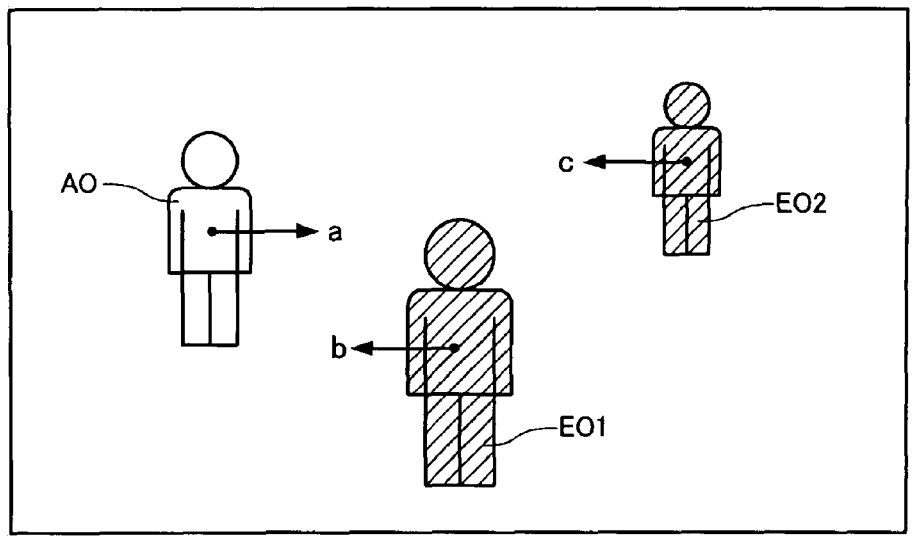
FIGS. 4A to 4C are views showing an image generated according to one embodiment of the invention.
Figure 4B:
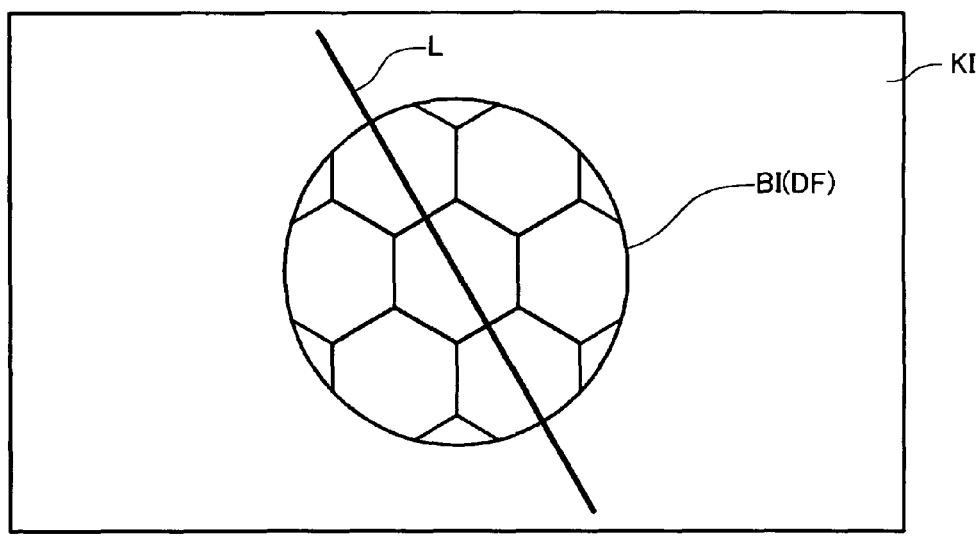
Figure 4C:
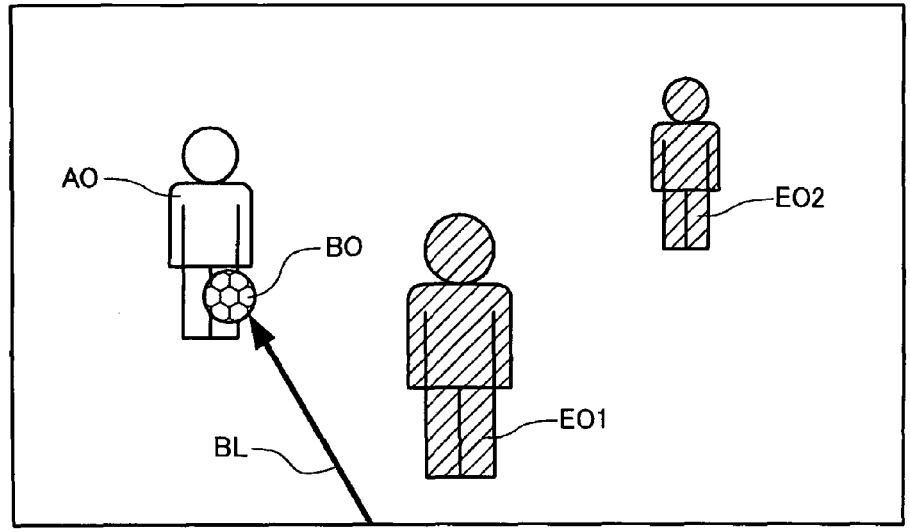

The principle is described below in detail with reference to FIGS. 4A to 4C. FIG. 4A shows an example of an image which is displayed in the first display area and in which the ally object AO and the enemy objects EO1 and EO2 move in the object space. FIG. 4B shows an example in which a kick operation instruction indication KI is displayed in the second display area. The image displayed in the second display area is an image of the operation instruction soccer ball IB imitating the ball object BO which moves in the object space. The image of the operation instruction soccer ball IB is an image in which a soccer ball placed on the ground is viewed from the upper side.

The operator performs a contact operation input for the kick operation instruction indication KI shown in FIG. 4B using the touch pen or the like while observing the first display area and determining the positions, the moving directions, the moving amounts, the moving velocities, and the like of the ally object AO and the enemy objects EO shown in FIG. 4A. For example, the ally object AO and the enemy objects EO1 and EO2 shown in FIG. 4A respectively move in the directions indicated by the arrows a, b, and c. The operator performs a contact operation input for the kick operation instruction indication KI using the touch pen to draw a contact operation path L, as shown in FIG. 4B. The input evaluation system calculates the moving direction, the moving amount, and the moving velocity of the ball object BO based on the contact operation position information detected from the touch panel, and displays an image in which the ball object BO moves, as shown in FIG. 4C. It is determined that the operator has succeeded in the operation when the ball object BO has hit the ally object AO. It is determined that the operator has failed in the operation when the ball object BO has hit the enemy object EO or when the ball object BO has not hit the ally object AO. After the hit check has been completed, the game is finished. The operator can repeatedly play the game, and the positions, the moving directions, the moving positions, the numbers, and the like of the ally object AO and the enemy object EO can be arbitrarily changed. This enables continuous training which does not cause the operator to lose interest.

According to the above configuration, the operator can develop the sports vision such as kinetic vision acuity, eye movement, and visual reaction time while imagining actually playing soccer.

4. Process According to this Embodiment

Figure 5:
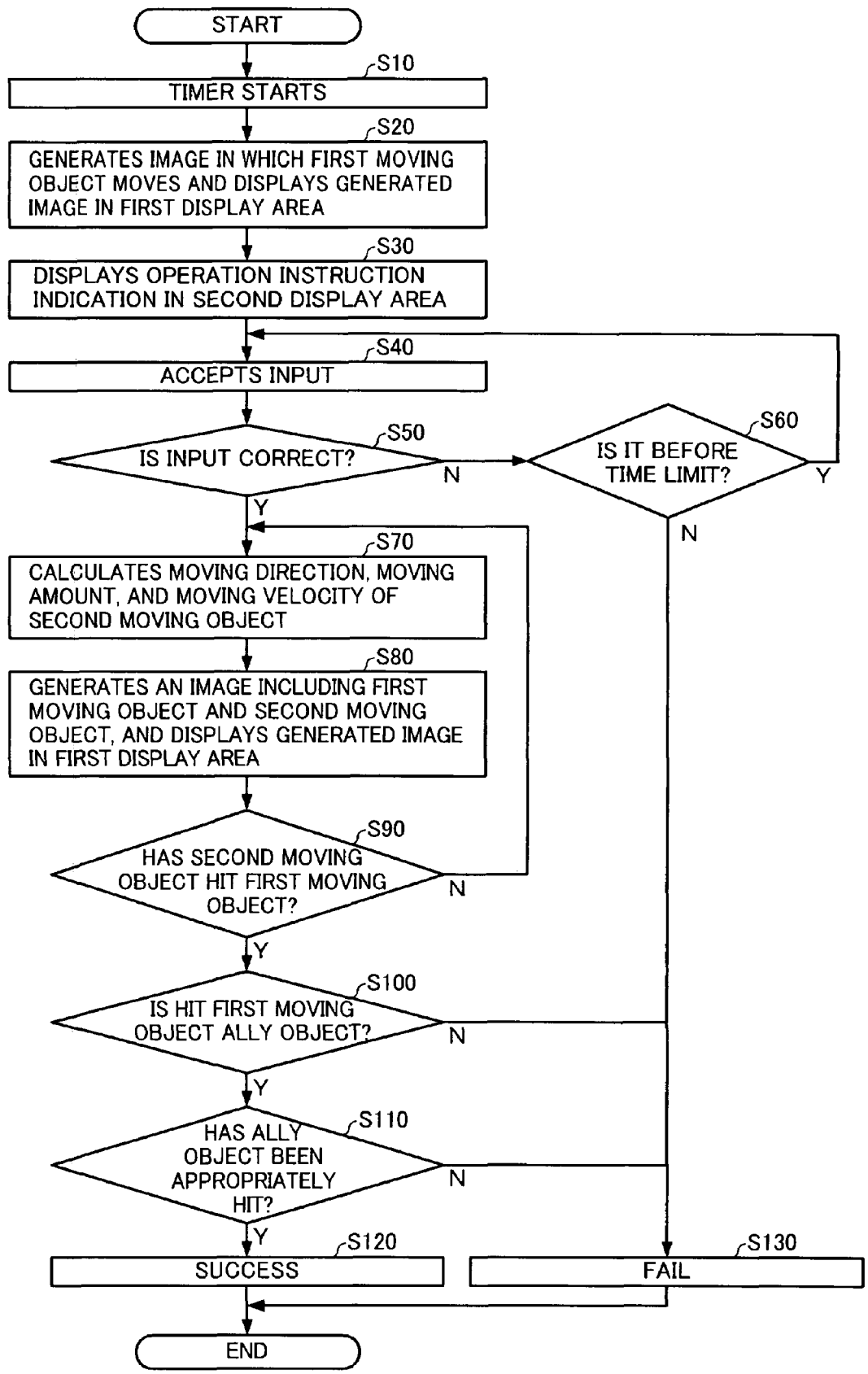
FIG. 5 is a flowchart showing an example of the flow of a process according to one embodiment of the invention.

The process according to this embodiment is described below. FIG. 5 is a flowchart schematically showing the process performed in the soccer game system according to this embodiment. In this embodiment, a soccer game is performed in which the player accurately passes the ball to an ally character within the time limit, as shown in FIGS. 4A to 4C. A timer starts in a step S10.

In a step S20, the game system generates an image in which the first moving object moves and which is displayed to have a depth, and displays the generated image in the first display area. In a step S30, the game system displays the operation instruction indication in the second display area. The operation instruction indication is an image corresponding to the contact detection area (e.g. touch panel) which prompts the operator to operate. In FIG. 4A, an image is displayed in the first display area in which the ally object AO moves in the direction indicated by the arrow a, the enemy object EO1 moves in the direction indicated by the arrow b, and the enemy object EO2 moves in the direction indicated by the arrow c, for example. As shown in FIG. 4B, an image of the operation instruction soccer ball IB imitating the ball object BO which moves in the object space is displayed in the second display area.

In a step S40, the game system accepts the input information from the contact detection area provided while being associated with the second display area. In this embodiment, the game system accepts the input from the contact detection area in frame units. The operator performs the operation input using the input device (e.g. touch pen), the finger, or the like. The game system according to this embodiment acquires the contact operation position information detected from the contact detection area (e.g. touch panel) and the contact operation time information indicating the period of time from the acquisition of the first contact operation position information to the acquisition of the second contact operation position information. For example, the operator inputs the contact operation path L for the touch panel using the touch pen, as shown in FIG. 4B. The game system then acquires the contact operation position information and the contact operation time information of the contact operation path L from the touch panel.

The game system determines whether or not the input is correct in a step S50. When the input is correct (step S50: Y), the game system transitions to a step S70. When the input is incorrect (step S50: N), the game system determines whether or not the time limit has not expired in a step S60. When the time limit has not expired (step S60: Y), the game system accepts a further input in the step 40. When the time limit has expired (step S60: N), the game system determines that the operation has failed (step S130), and the game is finished.

Figure 6A:
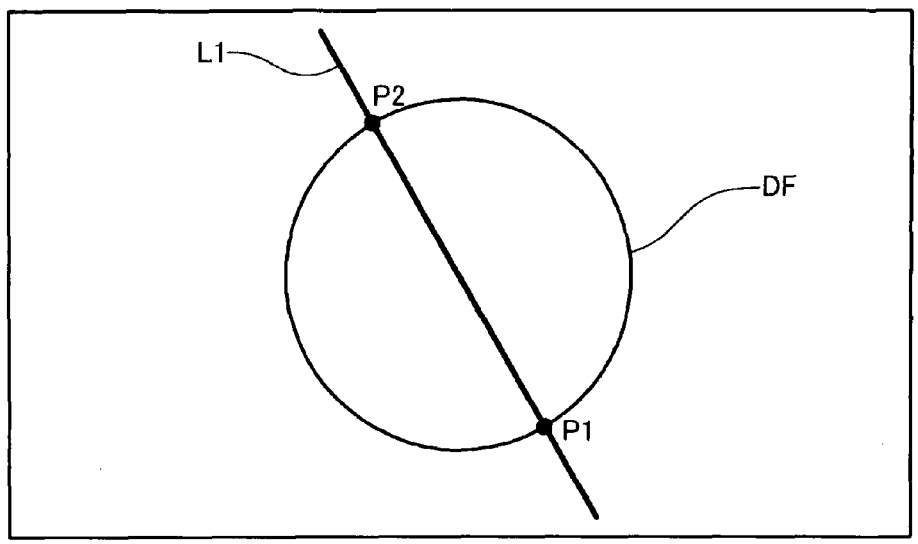
FIGS. 6A to 6C are views illustrative of a contact operation.
Figure 6B:
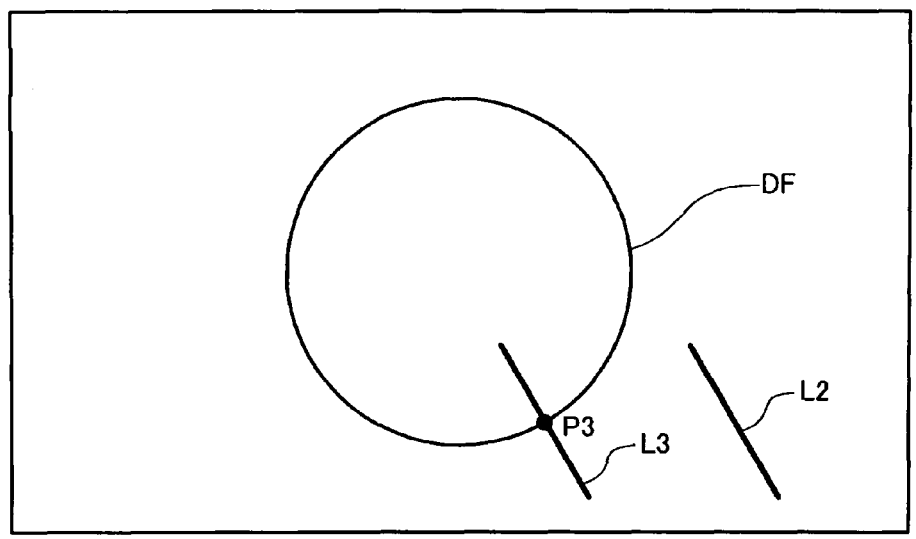
Figure 6C:
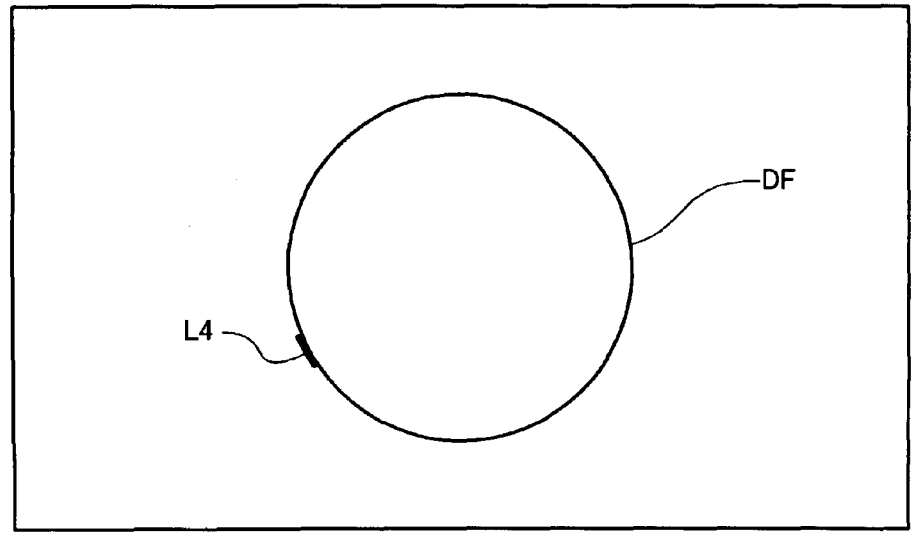

Whether or not the input is correct is determined based on whether or not the determination area set in the contact detection area overlaps the operator's contact operation path in the contact detection area. In FIG. 4B, the determination area DF may be the area corresponding to the operation instruction soccer ball IB. Whether or not the input is correct is determined based on whether or not the determination area DF overlaps the contact operation path L. As shown in FIG. 6A, since a contact operation path L1 crosses the determination area DF at the intersections P1 and P2, it is determined that the input is correct, for example. As shown in FIG. 6B, a contact operation path L2 does not cross the determination area DF. Therefore, it is determined that the input of the contact operation path L2 is incorrect. Although a contact operation path L3 crosses the determination area DF at an intersection P3, it is determined that the input of the contact operation path L3 is incorrect. When the position coordinates of two or more points in the determination area DF can be acquired, it may be determined that the input is correct. Specifically, if the position coordinates of two or more points can be acquired, the moving direction, the moving amount, and the moving velocity of the second moving object can be calculated. When the contact operation path is shorter than a predetermined value, it is determined that the input is incorrect. For example, a contact operation path L4 shown in FIG. 6C may be determined to be shorter than a predetermined value (i.e. incorrect).

Figure 7A:
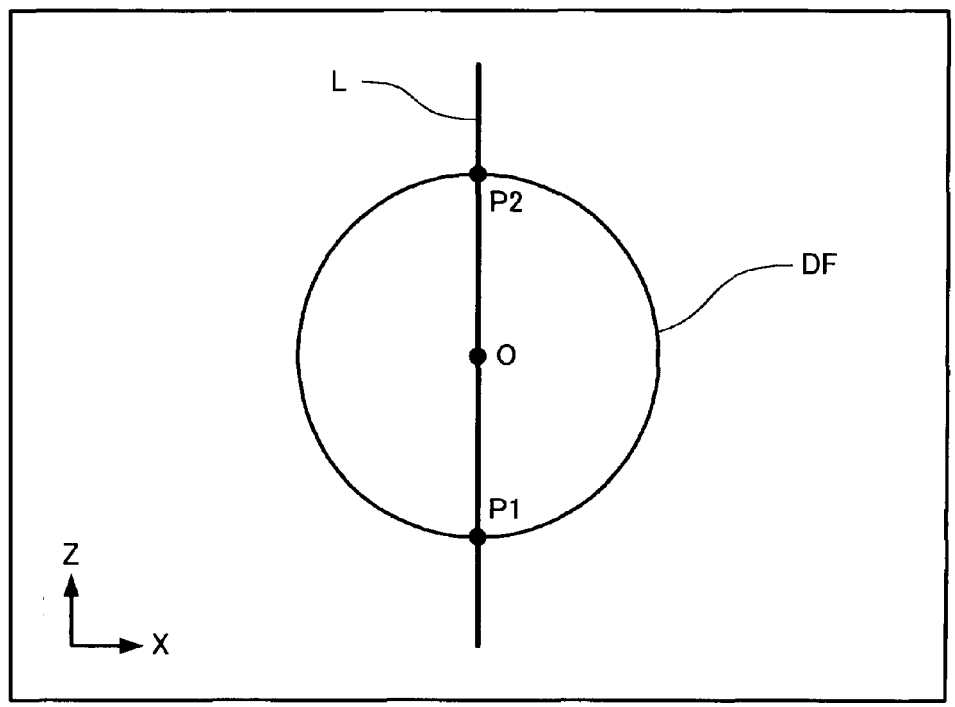
FIGS. 7A and 7B are views showing an image generated according to one embodiment of the invention.

In a step S70, the moving direction, the moving amount, and the moving velocity of the second moving object are calculated. Specifically, the game system may calculate the moving direction, the moving amount, and the moving velocity of the second moving object based on the starting point and the end point of the intersection area of the determination area set in the contact detection area and the operator's contact operation path in the contact detection area. As shown in FIG. 7A, the moving direction, the moving amount, and the moving velocity of the second moving object may be calculated based on the position coordinates P1 and P2 in the intersection area of the determination area DF and the contact operation path L. Specifically, the game system calculates the moving direction, the moving amount, and the moving velocity of the ball object BO based on the direction from the position coordinates P1 to the position coordinates P2, the length from the position coordinates P1 to the position coordinates P2, and the period of time from the acquisition of the position coordinates P1 to the acquisition of the position coordinates P2.

In a step S80, the game system generates an image including the first moving object and the second moving object, and displays the image in the first display area. For example, the game system generates an image in which the ball object moves along a moving path BL, as shown in FIG. 4C, and displays the image in the first display area.

Figure 7B:
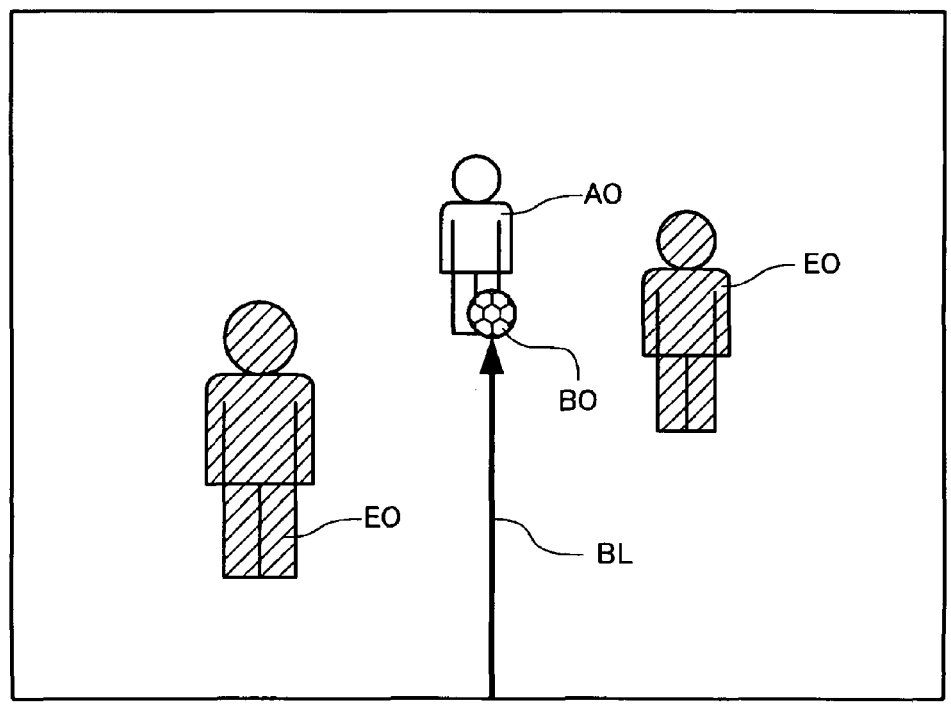

When the intersection area is a path in the Z axis direction which passes through the center O of the determination area, as shown in FIG. 7A, the moving direction, the moving amount, and the moving velocity of the ball object BO are calculated based on the position coordinates P1 of the starting point of the intersection area and the position coordinates P2 of the end point of the intersection area, and an image as shown in FIG. 7B is generated in which the ball object BO moves along the moving path BL in the depth direction (Z axis direction) indicated by the arrow, for example.

Figure 8A:
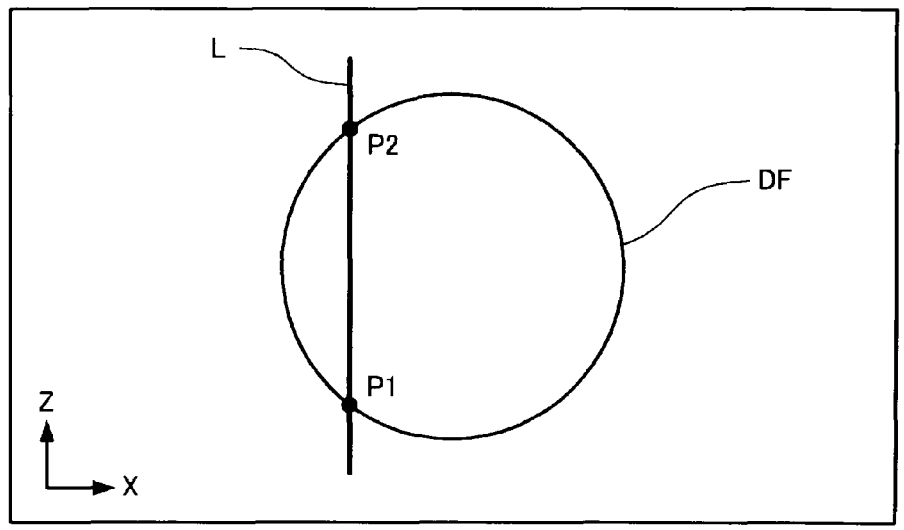
FIGS. 8A to 8C are views showing an image generated according to one embodiment of the invention.
Figure 8B:
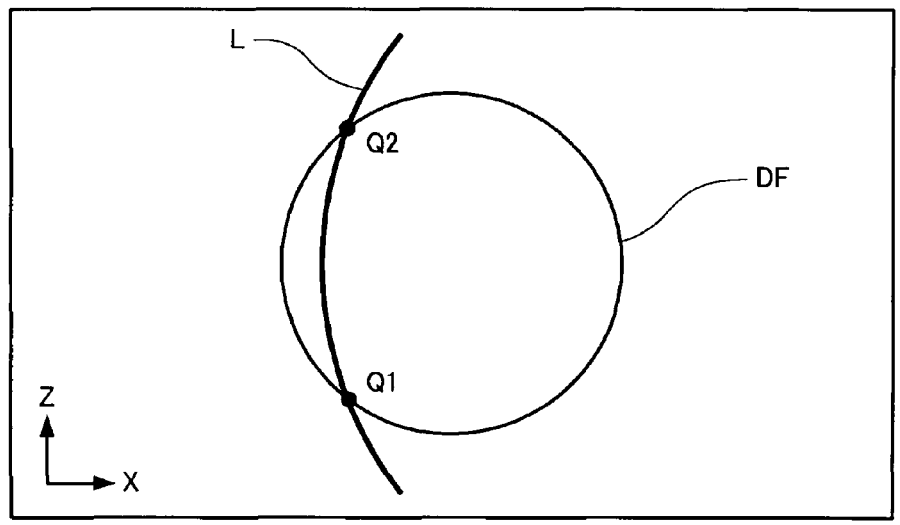
Figure 8C:
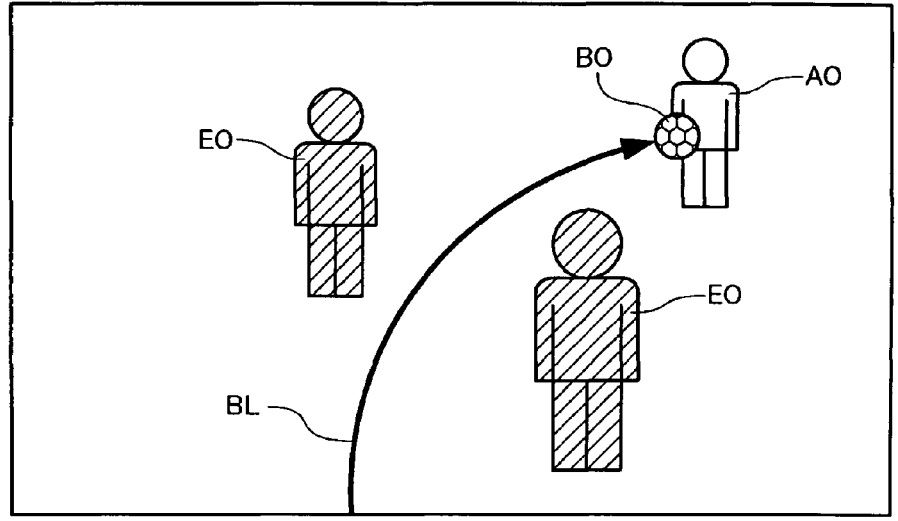

When the intersection area is a path in the Z axis direction which does not pass through the center O of the determination area, as shown in FIG. 8A, the moving direction, the moving amount, and the moving velocity of the ball object BO are calculated based on the position coordinates P1 of the starting point of the intersection area and the position coordinates P2 of the end point of the intersection area, and an image as shown in FIG. 8B is generated in which the ball object BO curves along the moving path BL in the direction indicated by the arrow, for example. When the intersection area is a curve, as shown in FIG. 8B, the moving direction, the moving amount, and the moving velocity of the ball object BO are calculated based on the position coordinates Q1 of the starting point of the intersection area and the position coordinates Q2 of the end point of the intersection area. In this case, an image as shown in FIG. 8C is generated in which the ball object BO curves along the moving path BL in the direction indicated by the arrow.

In a step S90, the game system determines whether or not the second moving object has hit the first moving object. When the second moving object has hit the first moving object (step S90: Y), the process proceeds to a step S100. When the second moving object has not hit the first moving object (step S90: N), the process returns to the step S70, and the steps S70 to S90 are repeatedly performed.

In the step S100, the game system determines whether or not the first moving object which has been hit is an ally object. When the first moving object which has been hit is not an ally object (S100: N), the process proceeds to a step S130 (fail), and the game is finished. When the first moving object which has been hit is an ally object (S100: Y), the process proceeds to a step S110 in which the game system determines whether or not the ally object has been appropriately hit. Specifically, when the second moving object has appropriately hit the ally object (step S110: Y), the process proceeds to a step S120 (success), and the game is finished. When the second moving object has not appropriately hit the ally object (step S110: N), the process proceeds to a step S130 (fail), and the game is finished.

The game system determines whether or not the second moving object has appropriately hit the ally object based on at least one of the moving amount and the moving velocity of the second moving object. In more detail, the game system determines that the second moving object has not appropriately hit the ally object when the distance between the position at which the player's character has kicked the ball object and the ally object which has been hit by the ball object in the object space is short. Specifically, since it is easy to accurately pass the ball object when the ally object is positioned near the player's character, the player may lose interest. The determination on whether or not the distance between the player's character and the ally object is short may be adjusted corresponding to the difficulty of the game. The game system determines that the second moving object has not appropriately hit the ally object when the ball object has moved at high speed. Specifically, when the ball object has moved at high speed, it is considered that the ally object cannot receive the ball object. In this case, the determination on whether or not the ball object has moved at high speed may be adjusted corresponding to the difficulty of the game. When the game system has determined that the ball object has not appropriately hit the ally object, the game system may generate an image in which the ball object rebounds from the ally object.

5. Modification

A modification according to this embodiment is described below. The step S30 of displaying the operation instruction indication in the second display area has been described above taking an example of displaying the ball object BO (second moving object) using FIG. 4B. In this embodiment, the number of operation instruction indications may be two or more. Specifically, the game system according to this embodiment may display a plurality of operation instruction indications in the second display area, acquire the contact operation position information corresponding to each operation instruction indication, and calculate the moving direction, the moving amount, and the moving velocity of the second moving object based on the acquired contact operation position information.

In more detail, the game system may display a first operation instruction indication in the second display area. The game system may display a second operation instruction indication in the second display area after accepting the operation input from the operator, and then accept the operation input from the operator. The game system may display the first operation instruction indication and the second operation instruction indication in the second display area, and accept the operation input corresponding to each operation instruction indication.

Figure 9A:
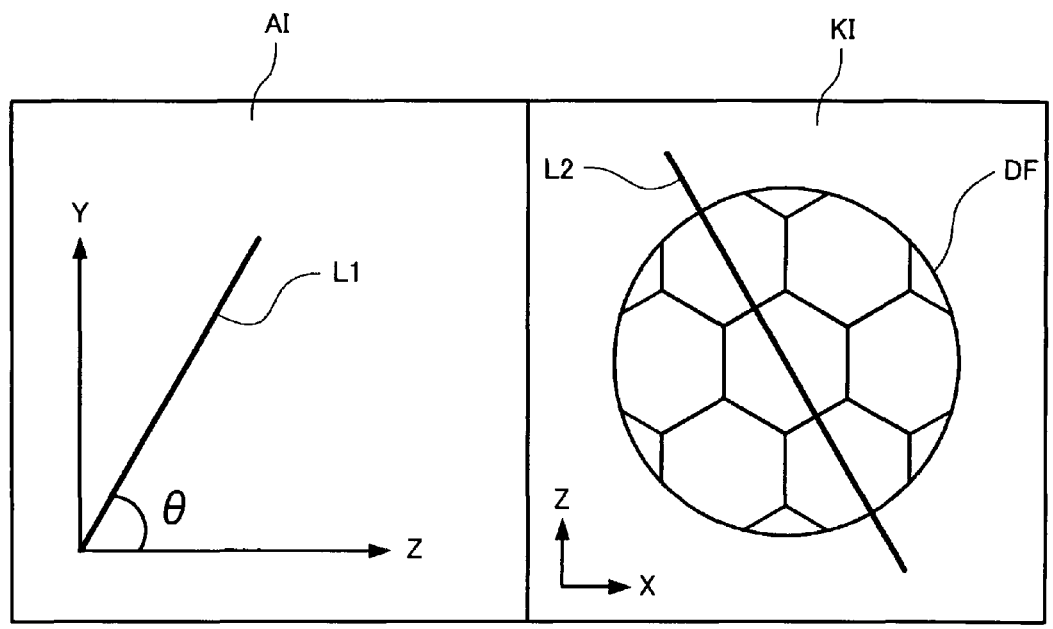
FIGS. 9A and 9B are views showing an image generated according to one embodiment of the invention.
Figure 9B:
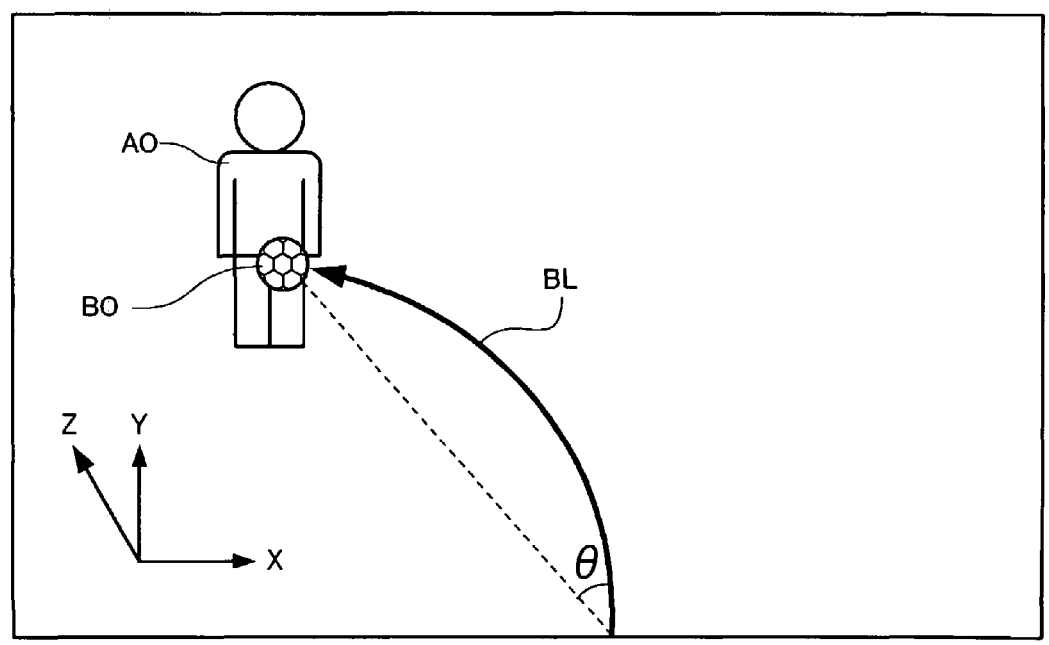

FIG. 9A shows an example in which an angle-of-elevation instruction indication AI for accepting angle-of-elevation information and the kick operation instruction indication KI are displayed in the second display area. The angle-of-elevation information is information necessary for calculating the angle of elevation formed by the horizontal plane and the moving direction of the ball object BO which moves in the object space. For example, the operator performs a contact operation input of drawing a contact operation path L1 on the angle-of-elevation instruction indication AI so that the angle of elevation become theta. The operator also performs a contact operation input of drawing a contact operation path L2 on the kick operation instruction indication KI. The game system according to this embodiment acquires the contact operation position information and the contact operation time information corresponding to each operation instruction indication from the contact detection area. The game system calculates the moving direction, the moving amount, and the moving velocity of the ball object BO based on the contact operation position information and the contact operation time information corresponding to each operation instruction indication. For example, an image as shown in FIG. 9B is displayed in the first display area in which the ball object BO moves along the moving path BL in the direction indicated by the arrow at an angle of elevation of theta.

Figure 10A:
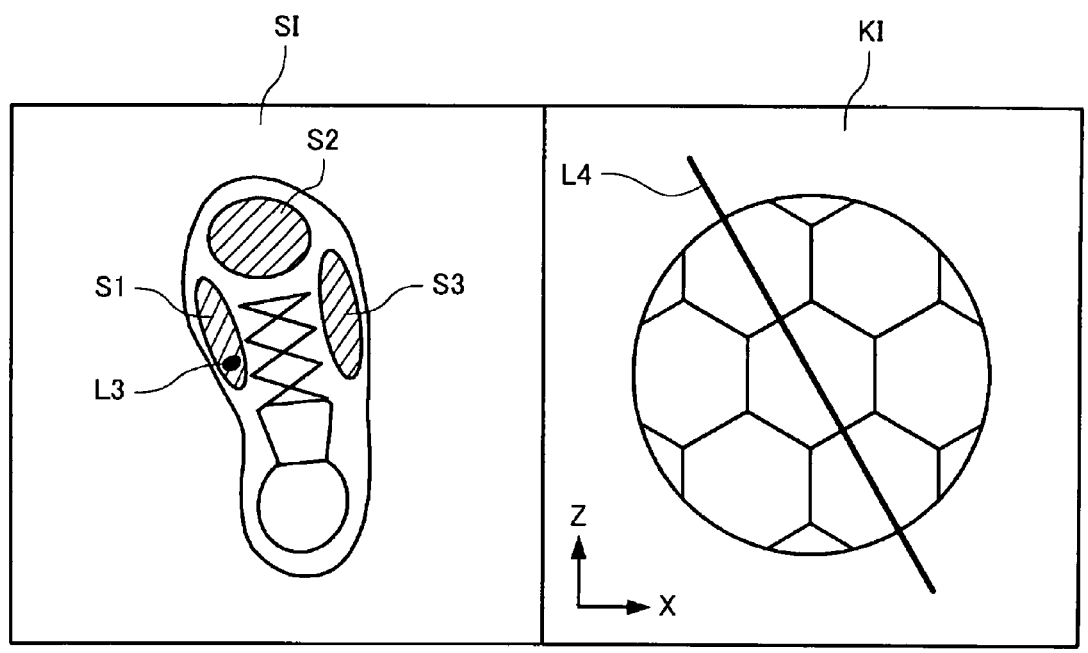
FIGS. 10A and 10B are views showing an image generated according to one embodiment of the invention.
Figure 10B:
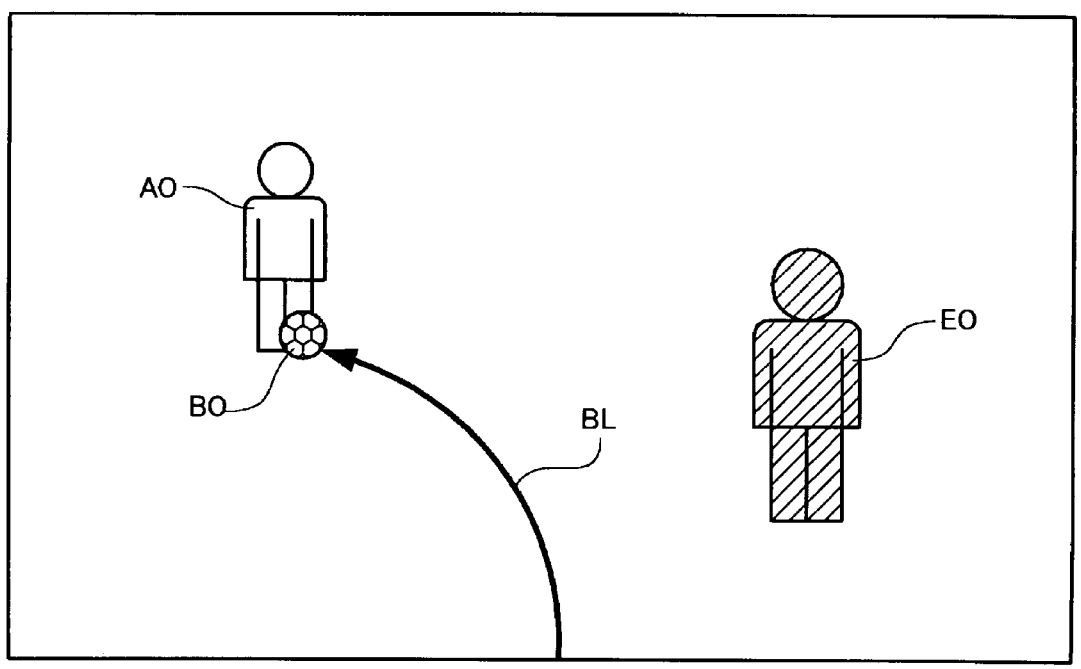

FIG. 10A shows an example in which a spike position instruction indication SI for specifying the spike kick position for kicking the ball object and the kick operation instruction indication KI are displayed in the second display area. As shown in FIG. 10A, the spike kick position includes a kick position SI for an inside-of-the-foot kick, a kick position S2 for a toe kick, and a kick position S3 for an outside-of-the-foot kick. The player performs a contact operation input of drawing the contact operation path L3 on the spike position instruction indication SI using the touch pen for specifying the kick position S1, for example, and performs a contact operation input of drawing a contact operation path L4 on the kick operation instruction indication KI. The game system according to this embodiment acquires the contact operation position information and the contact operation time information corresponding to each operation instruction indication. The game system calculates the moving direction, the moving amount, and the moving velocity of the ball object BO based on the contact operation position information and the contact operation time information corresponding to each operation instruction indication. For example, an image as shown in FIG. 10B is displayed in the first display area in which the ball object BO hit by an inside-of-the-foot kick moves along the moving path BL in the direction indicated by the arrow.

Figure 11A:
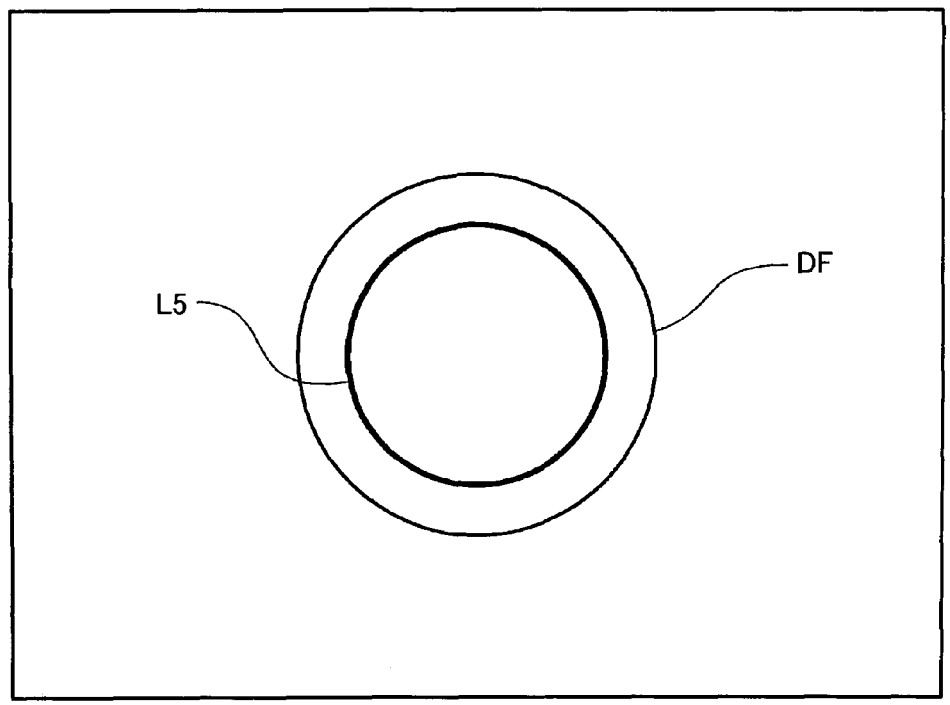
FIGS. 11A and 11B are views showing an image generated according to one embodiment of the invention.
Figure 11B:
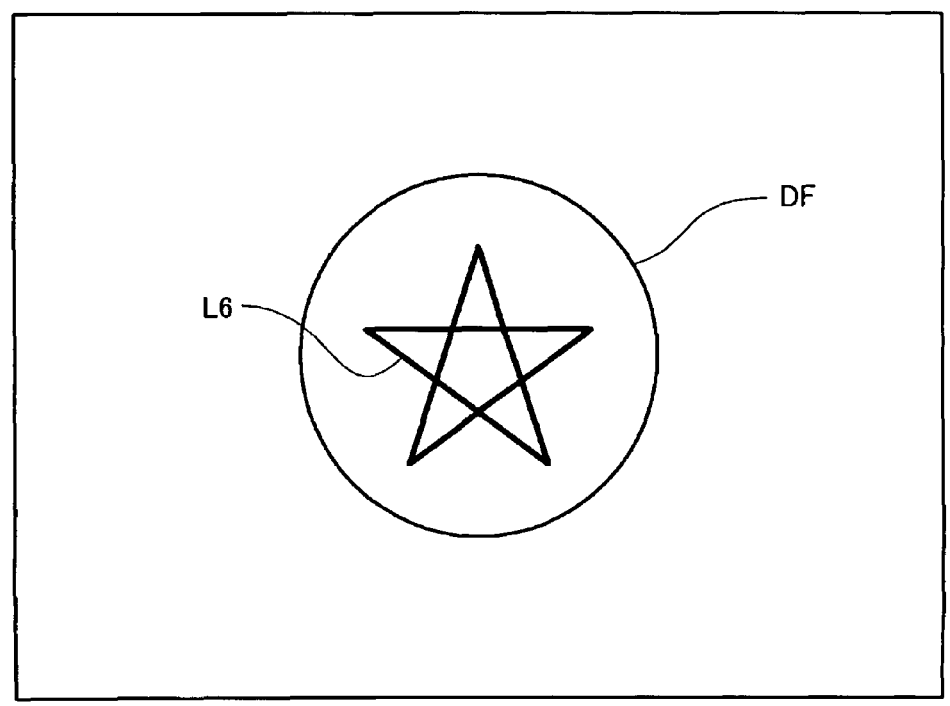

In this embodiment, the moving direction, the moving amount, and the moving velocity of the second moving object can be calculated based on the intersection area of the determination area set in the contact detection area and the contact operation path in the contact detection area, as described above. In this embodiment, the moving direction, the moving amount, and the moving velocity of the second moving object may be calculated based on the properties of the contact operation path. For example, when a contact operation path L5 is a path which draws a circle, as shown in FIG. 11A, the moving direction, the moving amount, and the moving velocity may be calculated so that the ball object rotates. When a contact operation path L6 is a path which draws a star mark, as shown in FIG. 11A, the moving direction, the moving amount, and the moving velocity may be calculated so that the ball object moves at a very high speed as a result of a special kick, for example.

The properties of the contact operation path may be determined by storing a path with a special shape in advance and determining whether or not the stored path with a special shape and the contact operation path have identical or similar shapes. When the special shape and the shape of the contact operation path are identical or similar, the moving direction, the moving amount, and the moving velocity of the second moving object corresponding to the special shape are calculated.

In the game system according to this embodiment, the player's character accurately passes the ball to the ally object in the object space within the time limit in the soccer game. Note that the rule and the setting conditions of the game system according to this embodiment may be appropriately changed. Specifically, the sports vision capability can be developed even if the rule and the setting conditions are changed.

For example, the game system according to this embodiment may be a game system in which the player's character accurately shoots a goal in the object space. In this case, the game system may perform a hit check between a goal object and the second moving object (ball object) in the object space. The game system according to this embodiment may be a game system in which the player's character accurately passes the ball to the ally object in other sports (basketball, American football, and rugby) games.

The game system for an American football or rugby game may evaluate whether or not the player's object holding a ball can run a given distance within the time limit without contacting the enemy object. For example, the game system generates an image in which the first moving object (enemy object) moves forward, and displays the image in at least one of the first display area and the second display area. The operator performs an operation input using the touch pen or the like in order to move the second moving object (player's object holding a ball). In this case, the operation input may be performed using a pen slide. The game system performs a hit check between the second moving object (player's object holding a ball) and the enemy object, and evaluates the results (hit: failed, not hit: success). This allows the operator to develop kinetic vision acuity (KVA) and judgment capability of sports vision.

6. Hardware Configuration

Figure 12:
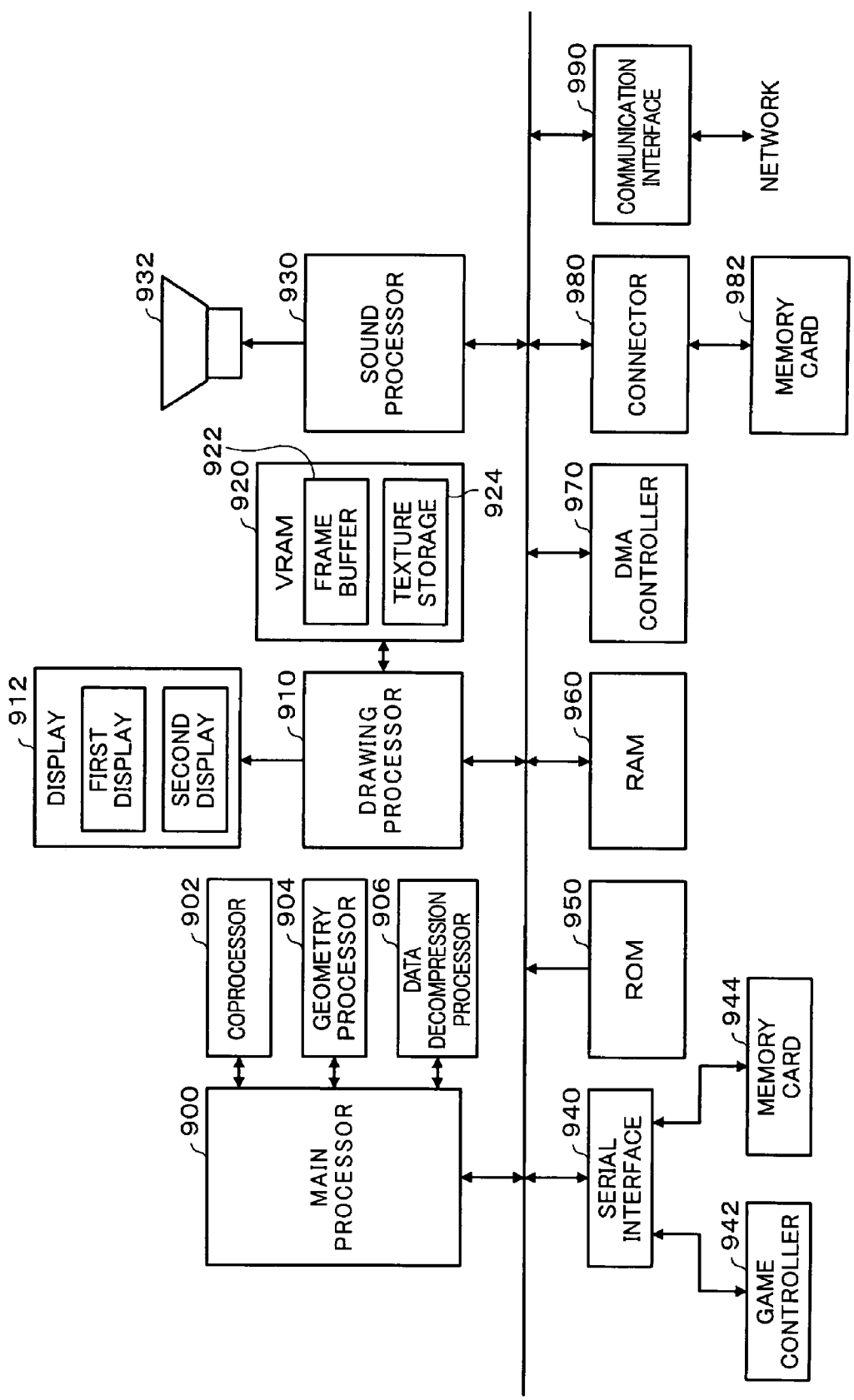
FIG. 12 is a view showing an example of a hardware configuration which can implement one embodiment of the invention.

FIG. 12 shows an example of the hardware configuration which can implement this embodiment. A main processor 900 operates based on a program stored in a memory card 982, a program downloaded through a communication interface 990, a program stored in a ROM 950, or the like, and performs a game process, image processing, sound processing, and the like. A coprocessor 902 assists the process of the main processor 900, and performs matrix calculations (vector calculations) at high speed. When matrix calculations are necessary for a physical simulation which causes an object to move or make a motion, a program which operates on the main processor 900 directs (requests) the coprocessor 902 to perform the matrix calculation process.

A geometry processor 904 performs a geometric process such as a coordinate transformation, perspective transformation, light source calculation, or curved surface generation based on instructions from a program operating on the main processor 900, and performs matrix calculations at high speed. A data decompression processor 906 decodes compressed image data or sound data, or accelerates the decoding process of the main processor 900. This enables a video image compressed according to the MPEG standard or the like to be displayed in a start screen or a game screen.

A drawing processor 910 draws (renders) an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs alpha blending (translucent processing), depth queuing, MIP mapping, a fog process, bilinear filtering, trilinear filtering, anti-aliasing, a shading process, and the like. When the image of one frame has been written into the frame buffer 922, the image is displayed on a display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input through a serial interface 940.

A system program or the like is stored in the ROM 950. In an arcade game system, the ROM 950 functions as an information storage medium in which various programs are stored. A hard disk may be used instead of the ROM 950. A RAM 960 functions as a work area for various processors. The DMA controller 970 controls DMA transfer between the processor and the memory. A connector 980 accesses the memory card 982 in which a program, image data, sound data, and the like are stored. The communication interface 990 transfers data with the outside through a network (communication line or high-speed serial bus).

The process of each section (each means) according to this embodiment may be implemented by only hardware, or may be implemented by a program stored in the information storage medium or a program distributed through the communication interface. Or, the process of each section may be implemented by hardware and a program.

When implementing the process of each section according to this embodiment by hardware and a program, a program for causing the hardware (computer) to function as each section according to this embodiment is stored in the information storage medium. In more detail, the program directs each of the processors 902, 904, 906, 910, and 930 (hardware) to perform the process, and transfers data to the processors, if necessary. The processors 902, 904, 906, 910, and 930 implement the process of each section according to this embodiment based on the instructions and the transferred data.

The invention is not limited to the above-described embodiments. Various modifications and variations may be made. For example, any term cited with a different term having a broader meaning or the same meaning at least once in the specification and the drawings may be replaced by the different term in any place in the specification and the drawings.

The invention may be applied to various input evaluation systems. The invention may be applied to a simulation system which generates an image in which various moving objects move. The invention may be applied to various image generation systems such as an arcade game system, consumer game system, large-scale attraction system in which a number of players participate, a simulator, a multimedia terminal, a system board which generates a game image, a portable telephone, an optometer, and a medical instrument.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A program stored in a non-transitory computer-readable information storage medium and used for evaluating an operation input of an operator, the program causing a computer to function as:
  a drawing section which generates an image which seems to have a depth, a first moving object moving in an object space in the image;
  an information acquisition section which acquires contact operation position information in a contact detection area in which a contact operation of the operator is detected while the image is displayed in a first display area, the contact operation having at least one of an operation direction, an amount of operation, and an operation speed;
  a movement processing section which calculates at least one of a moving direction, a moving amount, and a moving velocity of a second moving object based on a first intersection point and a second intersection point of a determination area set in the contact detection area and a contact operation path of the operator in the contact detection area and controls movement of the second moving object in the object space; and an evaluation section which evaluates the operation input of the operator based on a positional relationship between the first moving object and the second moving object in the object space.

2. The program as defined in claim 1, wherein the movement processing section calculates at least one of the moving direction, the moving amount, and the moving velocity of the second moving object based on, the first intersection point and the second intersection point and a period of time from the acquisition of the first intersection point to the acquisition of the second intersection point.

3. The program as defined in claim 1, wherein the drawing section generates an image which seems to have a depth based on priority set for each of the first moving objects.

4. The program as defined in claim 1, further causing the computer to function as:

an object space setting section which sets the first moving object and the second moving object in the object space, wherein the drawing section generates an image in which the object space is viewed from a given view point.

5. The program as defined in claim 1, wherein the drawing section generates an image to be displayed in a second display area corresponding to the contact detection area.

6. The program as defined in claim 5, further causing the computer to function as:

a display control section which displays a plurality of operation instruction indications in the second display area, wherein the information acquisition section acquires the contact operation position information corresponding to each of the operation instruction indications; and wherein the movement processing section calculates at least one of the moving direction, the moving amount, and the moving velocity of the second moving object based on the acquired contact operation position information.

7. The program as defined in claim 1, wherein the movement processing section calculates at least one of the moving direction, the moving amount, and the moving velocity of the second moving object based on properties of the contact operation path.

8. The program as defined in claim 1, wherein the movement processing section does not control the movement of the second moving object when the contact operation path has a length smaller than a predetermined value.

9. The program as defined in claim 1, wherein the movement processing section controls the movement of the second moving object based on the operation information acquired within a given time limit.

10. The program as defined in claim 1, further causing the computer to function as:

a hit check section which performs a hit check between the first moving object and the second moving object in the object space, wherein the evaluation section evaluates the operation input of the operator based on a result of the hit check.

11. The program as defined in claim 1, wherein the evaluation section evaluates the operator based on at least one of the moving amount and the moving velocity of the second moving object.

12. An input evaluation system executed in a non-transitory computer-readable medium for evaluating an operation input of an operator, comprising:

a drawing section which generates an image which seems to have a depth, a first moving object moving in an object space in the image;

an information acquisition section which acquires contact operation position information in a contact detection area in which a contact operation of the operator is detected while the image is displayed in a first display area, the contact operation having at least one of an operation direction, an amount of operation, and an operation speed;

a movement processing section which calculates at least one of a moving direction, a moving amount, and a moving velocity of a second moving object based on a first intersection point and a second intersection point of a determination area set in the contact detection area and a contact operation path of the operator in the contact detection area and controls movement of the second moving object in the object space; and an evaluation section which evaluates the operation input of the operator based on a positional relationship between the first moving object and the second moving object in the object space.

13. An input evaluation method executed in a non-transitory computer-readable medium for evaluating an operation input of an operator, the method comprising:

generating an image which seems to have a depth, a first moving object moving in an object space in the image;

acquiring operation information from an operation section which detects contact operation position information in a contact detection area in which a contact operation of the operator is detected while the image is displayed in a first display area, the contact operation having at least one of an operation direction, an amount of operation, and an operation speed;

calculating at least one of a moving direction, a moving amount, and a moving velocity of a second moving object based on a first intersection point and a second intersection point of a determination area set in the contact detection area and a contact operation path of the operator in the contact detection area and controlling movement of the second moving object in the object space; and evaluating the operation input of the operator based on a positional relationship between the first moving object and the second moving object in the object space.

* * * * *